(12) United States Patent
Wang et al.

(10) Patent No.: US 12,082,112 B2
(45) Date of Patent: Sep. 3, 2024

(54) METHODS AND WTRUS FOR WUR SCANNING

(71) Applicant: INTERDIGITAL PATENT HOLDINGS, INC., Wilmington, DE (US)

(72) Inventors: Xiaofei Wang, Cedar Grove, NJ (US); Oghenekome Oteri, San Diego, CA (US); Joseph S. Levy, Merrick, NY (US); Hanqing Lou, Syosset, NY (US); Li-Hsiang Sun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 344 days.

(21) Appl. No.: 17/434,571

(22) PCT Filed: Feb. 28, 2020

(86) PCT No.: PCT/US2020/020356
§ 371 (c)(1),
(2) Date: Aug. 27, 2021

(87) PCT Pub. No.: WO2020/176848
PCT Pub. Date: Sep. 3, 2020

(65) Prior Publication Data
US 2022/0132421 A1   Apr. 28, 2022

Related U.S. Application Data

(60) Provisional application No. 62/811,967, filed on Feb. 28, 2019.

(51) Int. Cl.
*H04W 52/00* (2009.01)
*H04W 48/08* (2009.01)
(Continued)

(52) U.S. Cl.
CPC ....... *H04W 52/0229* (2013.01); *H04W 48/08* (2013.01); *H04W 48/16* (2013.01); *H04W 52/0219* (2013.01); *H04W 84/12* (2013.01)

(58) Field of Classification Search
CPC ......... H04W 52/0229; H04W 52/0219; H04W 48/08; H04W 48/16
See application file for complete search history.

(56) References Cited

U.S. PATENT DOCUMENTS 9,042,324 B2   5/2015   Zhang et al.
9,521,671 B2   12/2016  Choi et al.
(Continued)

FOREIGN PATENT DOCUMENTS

EP    3 528 556        8/2019
WO    2018085635 A1    5/2018

OTHER PUBLICATIONS

"Layer Management," Draft Standard for Information technology—Telecommunications and information exchange between systems Local and metropolitan area networks—Specific requirements; Part 11: Wireless LAN Medium Access Control (MAC) and Physical Layer (PHY) Specifications, IEEE P802.11-REVmd/D2.0, pp. 1-526 (Dec. 12, 2018).

(Continued)

*Primary Examiner* — Erika A Washington
(74) *Attorney, Agent, or Firm* — VOLPE KOENIG

(57) ABSTRACT

A method for use in a wireless transmit/receive unit (WTRU) is disclosed. The method comprises: generating, by a Station Management Entity (SME), a request primitive enabling a wake-up radio (WUR) scanning process for WUR discovery frames transmitted by one or more access points (APs), the request primitive comprising a plurality of first parameters; conducting the WUR scanning process using WUR based on the plurality of the first parameters; generating, at a MAC layer, at least one confirm primitive (Continued)

based on a result of the WUR scanning process and at least a part of the plurality of first parameters; and communicating, from the MAC layer to the SME, the at least one confirm primitive.

20 Claims, 16 Drawing Sheets

(51) Int. Cl.
    *H04W 48/16*     (2009.01)
    *H04W 52/02*     (2009.01)
    *H04W 84/12*     (2009.01)

(56) References Cited

U.S. PATENT DOCUMENTS

| | | | |
|---|---|---|---|
| 9,603,116 | B2 | 3/2017 | Seok |
| 10,154,517 | B2 | 12/2018 | Seok |
| 10,887,837 | B1 | 1/2021 | Chu et al. |
| 2019/0174413 | A1* | 6/2019 | Huang ............... H04W 48/12 |

OTHER PUBLICATIONS

Asterjadhi et al., "802.11aX operation in 6GHZ band," IEEE 802.11-18/1256r0 (Jul. 8, 2018).
Chitrakar et al., "Comment Resolution on clause 30.11 WUR Discovery," IEEE 802.11-19/0329r0 (Mar. 7, 2019).
Chitrakar et al., "Comment Resolutions for Clause 6.3 MLME SAP CIDs," IEEE 802.11-19/1068r3 (Jul. 8, 2019).
Choi et al., "View on EHT Objectives and Technologies," IEEE 802.11-18/1171r0 (Jul. 8, 2018).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Wake Up Radio Operation, IEEE P802.11ba/D2.0 (Jan. 2019).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Wake Up Radio Operation, IEEE P802.11ba/D3.0 (Jan. 2019).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Wake Up Radio Operation, IEEE P802.11ba/D3.1 (Aug. 2019).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHZ, IEEE P802.11ac/D1.0 (May 2011).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D4.0 (Feb. 2019).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 2: Enhanced throughput for operation in license-exempt bands above 45 Ghz, IEEE P802.11ay/D3.0 (Feb. 2019).
Gidvani et al., "6 GHz operation for 11ax," IEEE 802.11-18/1607r1 (Sep. 11, 2018).
Hamilton, "WUR Reference Models," IEEE 802.11-18/1017r1 (Jun. 30, 2018).
Hart et al., "Recommended Direction for EHT," IEEE 802.11-18/1549r0 (Sep. 9, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Li et al., "WUR Discovery Frame Content," IEEE 802.11-18/0160r7 (Jan. 14, 2018).
Montemurro, "EHT TIG Agenda," IEEE 802.11-18/1067r2 (Jul. 10, 2018).
Nan et al., "Advertising WUR Discovery Frame Related Info for Fast Scanning," IEEE 802.11-18/0244r1 (Feb. 11, 2018).
Nan et al., "Consideration on WUR frame for Fast Scanning," IEEE 802.11-17/1619r2 (Jan. 2018).
Porat et al., "Distributed MU-MIMO and HARQ Support for EHT," IEEE 802.11-18/1116r0 (Jul. 6, 2018).
Shilo et al., "HARQ for EHT—Further Information," IEEE 802.11-18/1955r0 (Nov. 2018).
Shilo et al., "HARQ for EHT," IEEE 802.11-18/1587r1 (Sep. 3, 2018).
Wang et al., "Discussion on Functional Requirements," IEEE 802.11-19/1240r1 (Jul. 9, 2019).
Yang et al., "Discussion on EHT Study Group Formation," IEEE 802.11-18/1180r0 (Jul. 9, 2018).
Yang et al., "Discussion on HARQ for EHT," IEEE 802.11-18/1963r1 (Nov. 11, 2018).
Yang, "Issues with resolutions to CIDs 2592 and 2684," IEEE 802.11-19/0650r0 (Apr. 17, 2019).
Zeineddine et al., "Inter-Frame Coding for Broadcast Communication," IEEE Journal on Selected Areas in Communications 34(2) (2015).
Chitrakar et al., "Comment Resolution for Clause 6.3 MLME SAP," IEEE 802.11-19/0327r0 (Mar. 8, 2019).
Nan et al., "Consideration on WUR frame for Fast Scanning," IEEE 802.11-17/1619r1 (Nov. 2017).

* cited by examiner

METHODS AND WTRUS FOR WUR SCANNING

CROSS-REFERENCE TO RELATED APPLICATIONS

This application is the U.S. National Stage, under 35 U.S.C. § 371, of International Application No. PCT/US2020/020356, filed Feb. 28, 2020, which claims the benefit of U.S. Provisional Application No. 62/811,967, filed Feb. 28, 2019, the contents of which are incorporated herein by reference.

BACKGROUND

Fixed or low mobility wireless communication for local area networks (LANs) utilize technologies such as the Institute of Electrical and Electronics Engineers (IEEE) 802.11a, 802.11b, 802.11g, 802.11n, 802.11ac, 802.11ax, 802.11be, or generally 802.11x, also generally referred to as WiFi. These technologies relate to medium access control (MAC) and physical layer (PHY) specifications for creating wireless LANs (WLANs) between at least two points. With the growth of WLANs, it may be desirable to transmit signals in the same transmission for a number of types of WLAN interfaces to achieve desired performance and spectral efficiency.

SUMMARY

A method for use in a wireless transmit/receive unit (WTRU) is disclosed. The method comprises: generating, by a Station Management Entity (SME), a request primitive enabling a wake-up radio (WUR) scanning process for WUR discovery frames transmitted by one or more access points (APs), the request primitive comprising a plurality of first parameters; conducting the WUR scanning process based on the plurality of the first parameters; and generating, at a MAC layer, at least one confirm primitive based on a result of the WUR scanning process and at least a part of the plurality of first parameters; and communicating, from the MAC layer to the SME, the at least one confirm primitive.

A wireless transmit/receive unit (WTRU) is disclosed. The WTRU comprise: a processor, configured to generate a request primitive enabling a WRU scanning process for WUR discovery frames transmitted by one or more access points (APs), the request primitive comprising a plurality of first parameters; conduct the WUR scanning process based on the plurality of the first parameters; generate, at a MAC layer, at least one confirm primitive based on a result of the WUR scanning process and at least a part of the plurality of first parameters; and communicate, from the MAC layer to a Station Management Entity (SME), the at least one confirm primitive.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
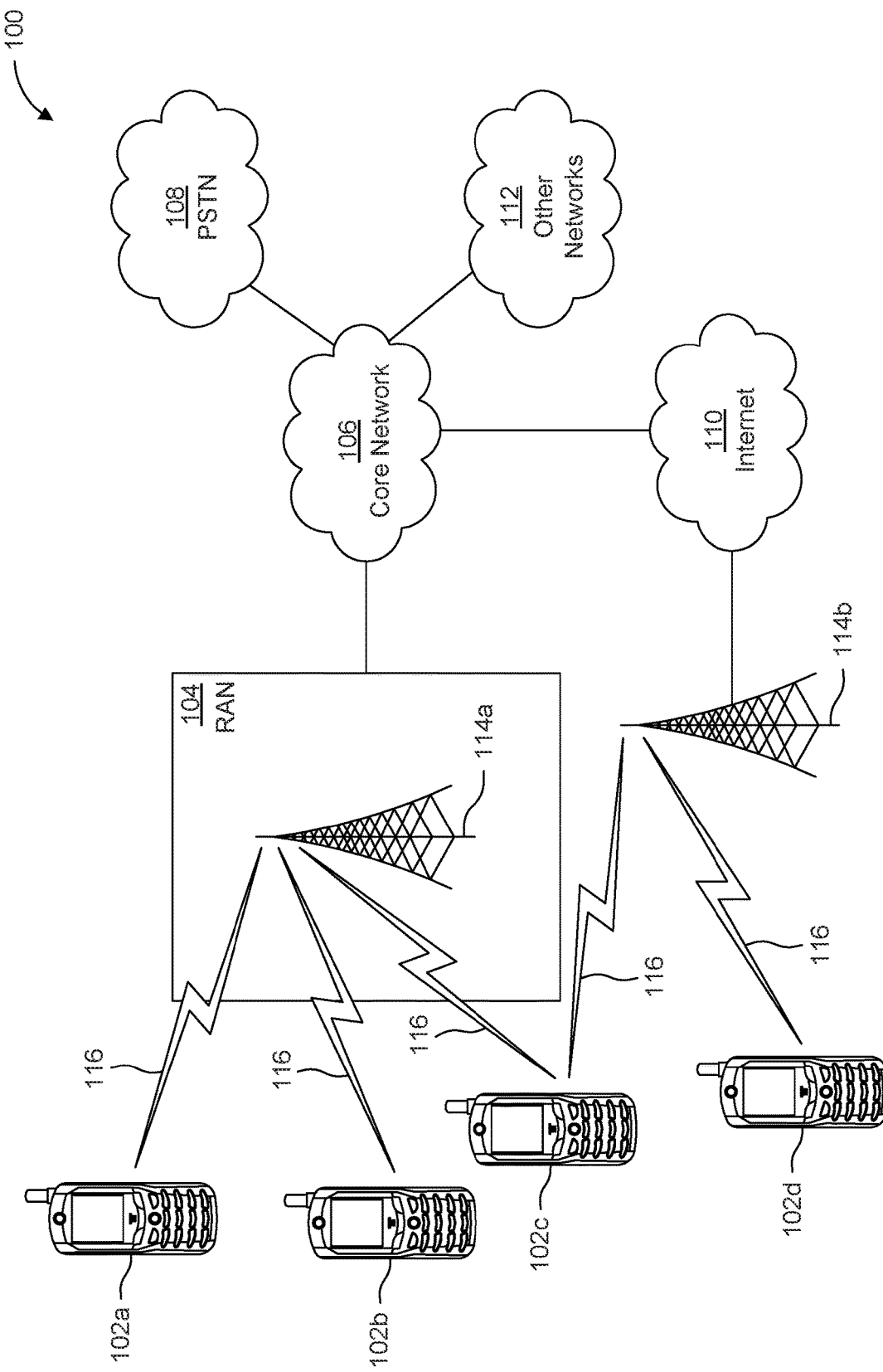
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE. It should be noted that in this application, unless otherwise indicated, the terms "WTRU" and "STA" may be used interchangeably.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
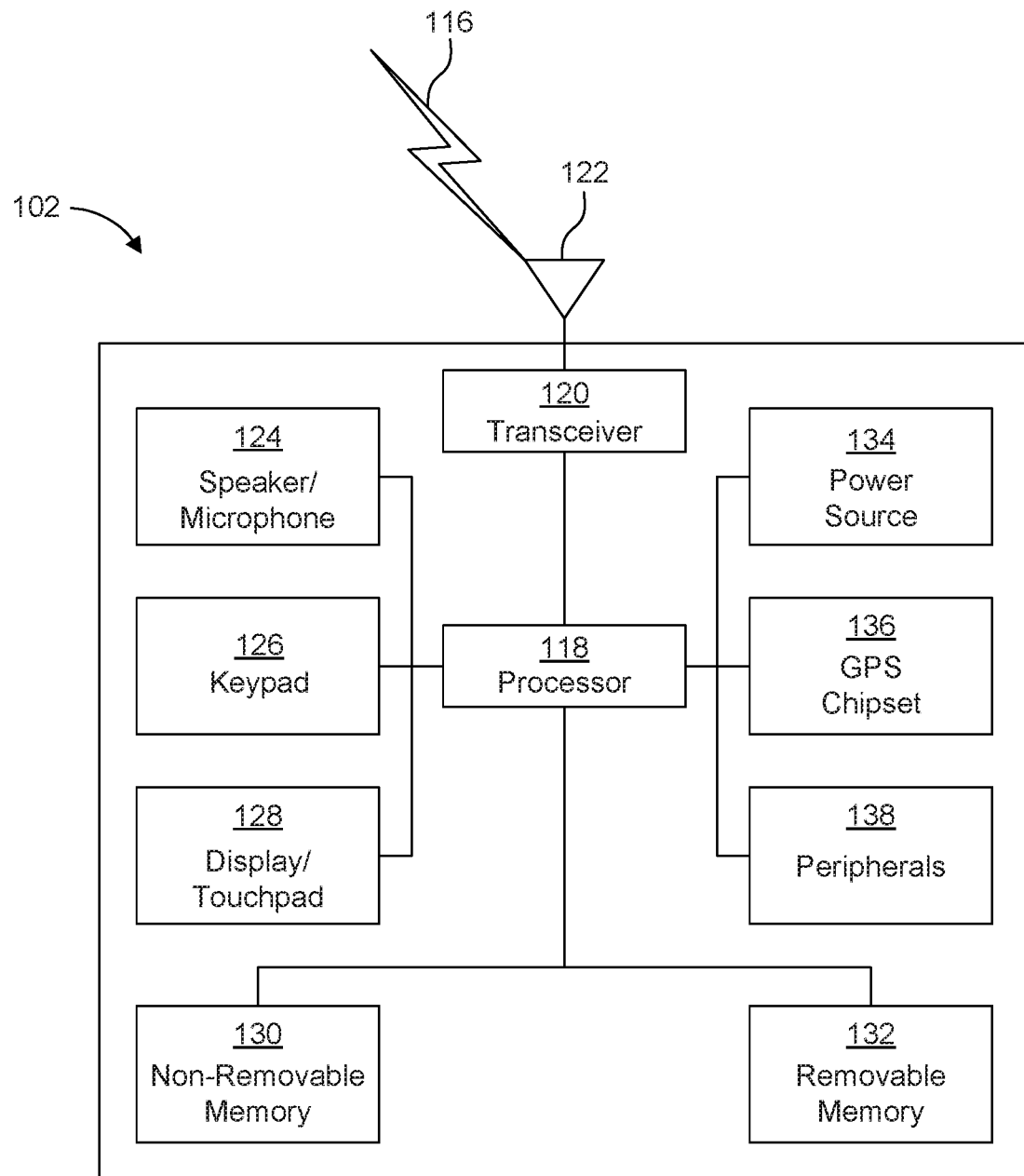
FIG. 1B is a system diagram illustrating an example wireless transmit/receive unit (WTRU) that may be used within the communications system illustrated in FIG. 1A according to an embodiment.
Figure 1C:
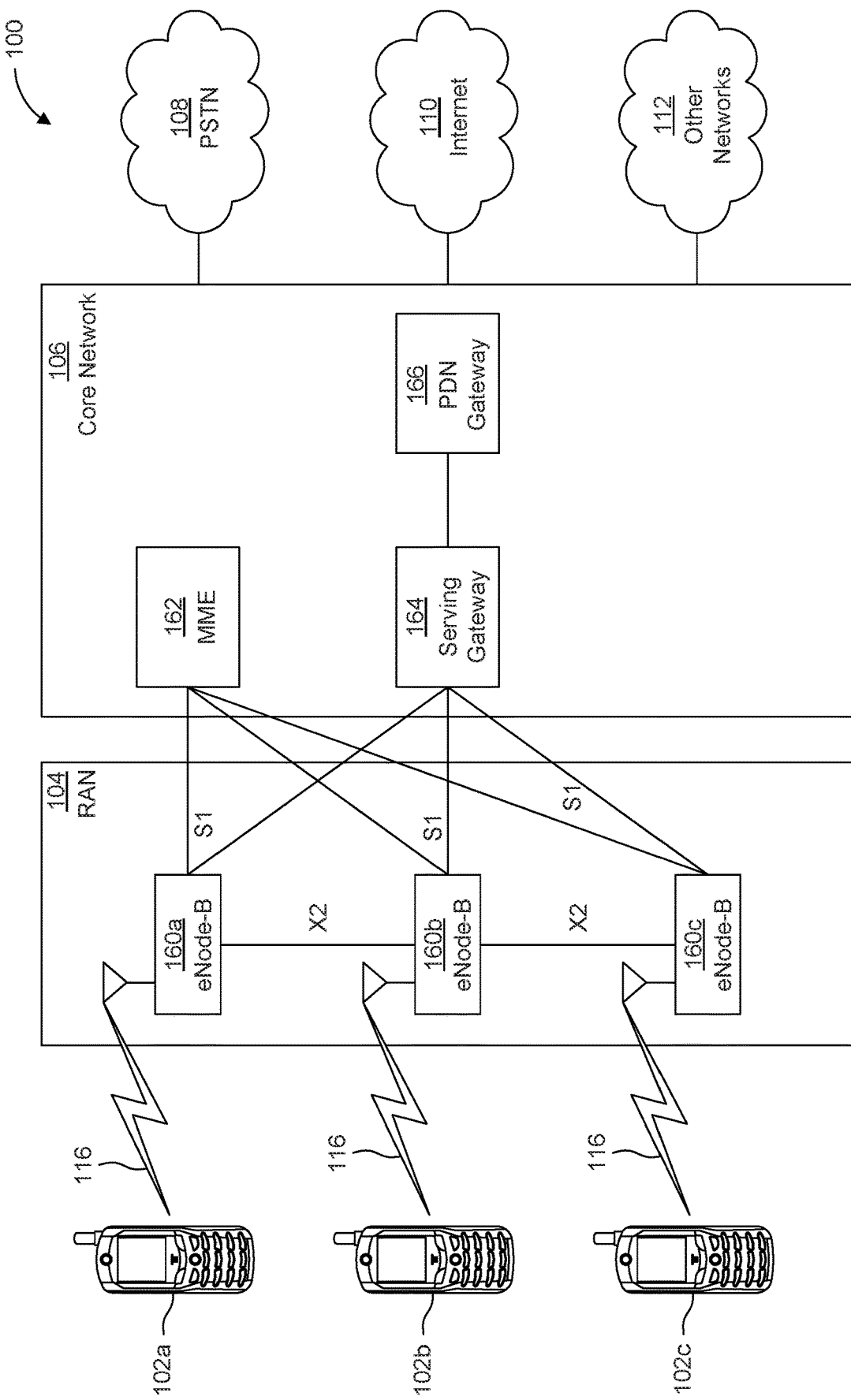
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source

134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
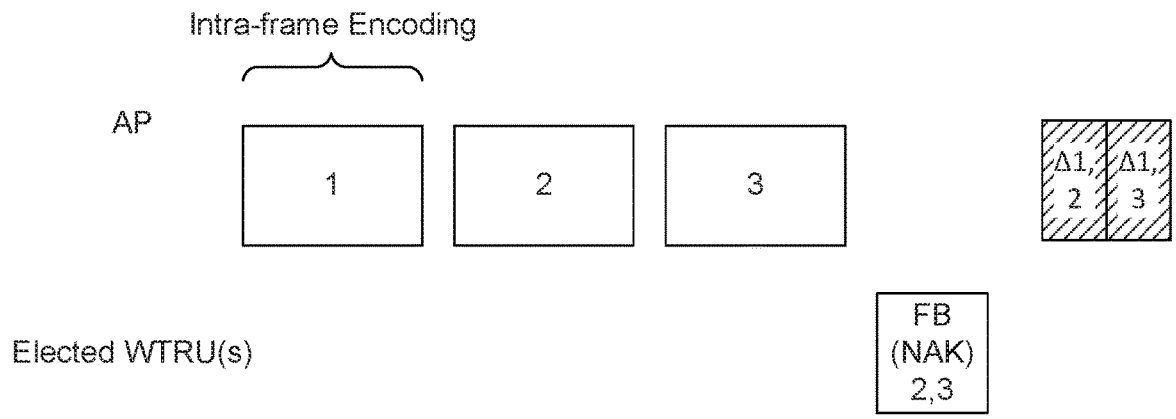
FIG. 10 shows an example of inter-frame encoding/partial HARQ with feedback and dynamic incremental subframe selection.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
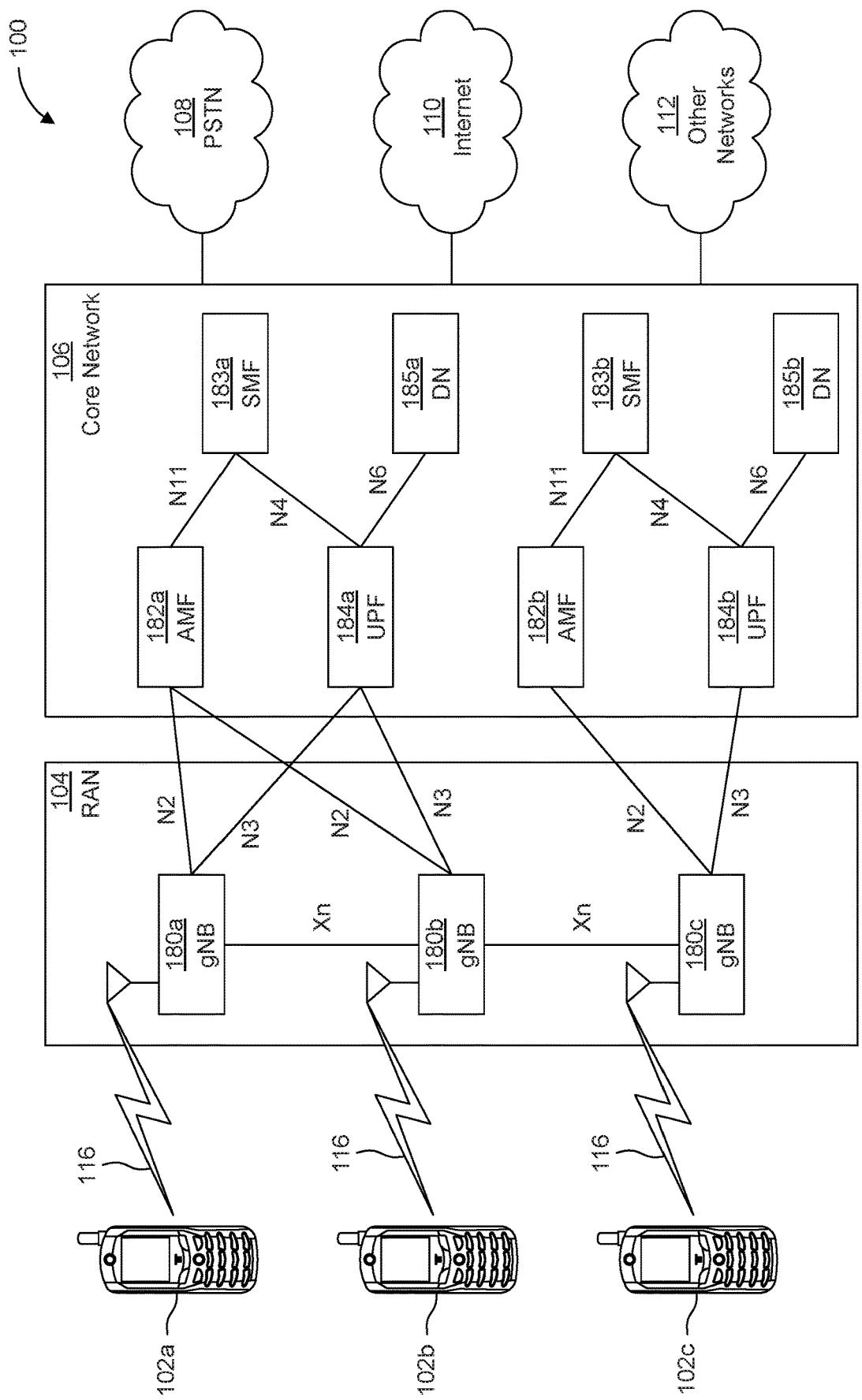
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The IEEE 802.11 High Efficiency WLAN (HEW) Study Group (SG) was created to explore the scope and purpose of a possible, future amendment to enhance the quality of service all users experience for a broad spectrum of wireless users in many usage scenarios including high-density scenarios in the 2.4 GHz, 5 GHz and 6 GHz band. New use cases which support dense deployments of APs, and STAs, and associated Radio Resource Management (RRM) technologies are being considered by the HEW SG. Potential applications for HEW include emerging usage scenarios such as data delivery for stadium events, high user density scenarios such as train stations, or enterprise/retail environments, and also evidence for an increased dependence on video delivery, and wireless services for medical applications. The IEEE Standard board approved the IEEE 802.11ax Task Group (TG) based on the results developed in the HEW SG.

In TGax standard meetings, several contributions showed that the measured traffic for a variety of applications has a large likelihood for short packets, and there are network applications that may also generate short packets. The applications include the following: virtual office; TPC ACK; video streaming ACK; device/controller (e.g., mice, keyboards, game controls, etc.); access (e.g., probe request/response); network selection (e.g., probe requests, access network query protocol (ANQP)); and/or network management/control frames. Contributions in 802.11ax have proposed the introduction of multi-user (MU) features that include uplink (UL) and downlink (DL) OFDMA and UL and DL MU-MIMO. Designing and defining a mechanism for multiplexing UL random access for different purposes may be used in 802.11ax and other protocols.

Proposals to TGax regarding medium access issues in the 6 GHz band include the use of triggered or scheduled medium access only in the 6 GHz band, and/or restriction of active scanning and scheduling enhanced distributed channel access (EDCA) medium access in the 6 GHz band.

The IEEE 802.11ba TG was created to define a physical (PHY) and medium access control (MAC) amendment to provide enhanced low power operations of 802.11 devices. The MAC and PHY amendments may enable operations of a wake-up radio (WUR). The expected operation bands of the WUR include 2.4 GHz, 5 GHz and may be extended to Sub 1 GHz. A WUR device may operate as a companion radio to the primary connectivity radio (PCR), which is used to transmit regular 802.11 packets. The PCR may also be referred to as the main radio. The WUR may transmit packets that carry (only) control information and may have active receiver power consumption of less than one milliwatt (mW). Receiving a wake-up packet by the WUR may cause the primary connectivity radio (PCR) to wake up from sleep. In an example, the WUR may have a range that is at least the same as the range of the primary connectivity radio operating on at least a 20 MHz payload bandwidth.

Both AP and non-AP STAs may have a WUR as a companion radio. Example use cases for WUR include: IoT devices; low power operation for smart phones; quick message/incoming call notification scenario; quick status query/report, configuration change scenario; and/or quick emergency/critical event report scenario.

The IEEE 802.11bc TG was created to define a MAC amendment to enhanced broadcast service (eBCS) for 802.11 devices. The IEEE 802.11bc amendment may not impact the IEEE 802.11 PHY specifications. eBCS service may be in the DL direction from an AP to non-AP STAs or may be UL direction from sensor non-AP STAs. eBCS may be provided to STAs that are associated or unassociated with a particular AP. An AP may be expected to support up to 3000 non-AP STAs with eBCS service. In addition, there may be a class of low-cost non-AP STAs that consumes the eBCS service and may not be able to transmit directly to the AP. Example use cases for eBCS may include: stadium video broadcasting; automotive broadcasting; uplink sensor data broadcasting; museum information and multilingual broadcasting; and/or event producer information and content broadcasting.

In intra-frame encoding for broadcast, or other, channels, the contents of a transmitted frame may be derived from a single set of encoded bits. In inter-frame coding, the contents of a transmitted frame may be derived from multiple sets of encoded bits that would normally be transmitted in separate frames but are generated (e.g., using linear encoding on additional increments) to form new subframes that may be transmitted to assist with decoding. This allows the broadcast signal to be transmitted to all the received WTRUs (STAs) with increased reliability with a progressive form of rate matching to allow for a smooth variation in the rate of the code. The encoder used is typically a rate compatible code where for any two code rates R>R', the rate-R' frame is a concatenation of the rate-R frame and the extra redundancy bits.

WUR scanning has been agreed for 802.11ba devices. In WUR scanning, an AP may send out WUR discovery frames providing information regarding itself and its BSS. WTRUs that are WUR capable may scan for WUR discovery frames in order to discover suitable APs and BSSs for association. However, MAC layer management entity (MLME) primitives may need to be defined for a WTRU to start WUR scanning and/or to provide collected information regarding received WUR discovery frames to higher layers. Appropriate MLME primitives may be defined so that WTRUs can control the WUR scanning process as well as provide information regarding the received WUR discovery frames collected during the WUR scanning process to the higher layer. It should be noted that unless otherwise indicated, the terms WUR scanning and WUR scanning process may be used interchangeably.

To address the above issue, methods and WTRUs according to this application will be described as follows.

Figure 2A:
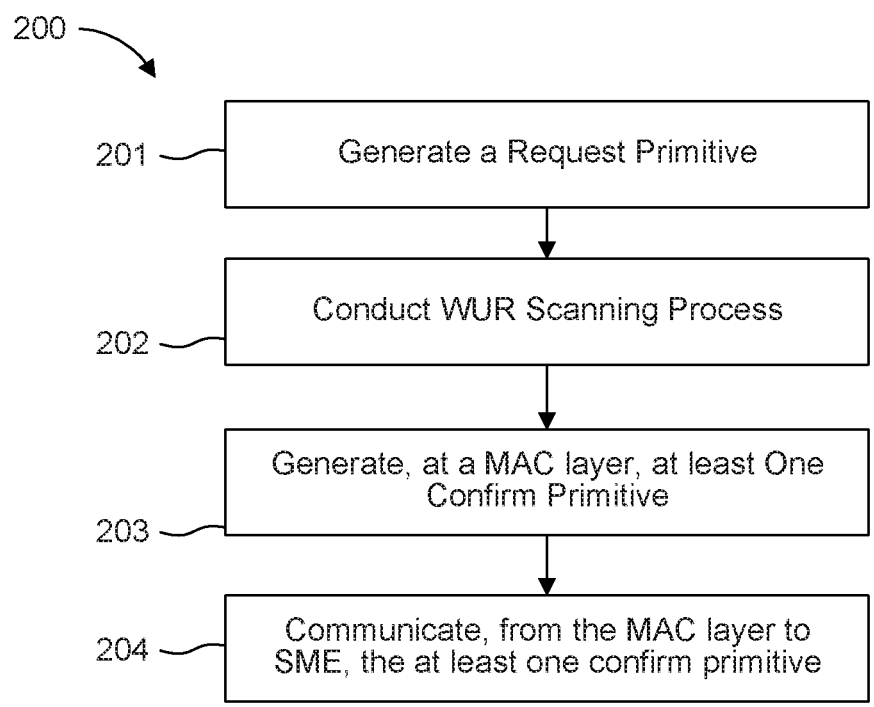
FIG. 2A is a flowchart illustrating a method according to an embodiment of this application.

A method 200 according to an embodiment of this application will be described with reference to FIG. 2A below. FIG. 2A shows a flowchart of the method 200. As shown in FIG. 2A, the method 200 may comprise: at 201, generating, by a Station Management Entity (SME), a request primitive enabling a wake-up radio (WUR) scanning process for WUR discovery frames transmitted by one or more access points (APs), the request primitive comprising a plurality of first parameters; at 202, conducting the WUR scanning process based on the plurality of the first parameters; at 203, generating, at a medium access control (MAC) layer, at least one confirm primitive based on a result of the WUR scanning process and at least a part of the plurality of first parameters; and at 204, communicating, from the MAC layer to the SME, the at least one confirm primitive.

Accordingly, the WTRU according to an embodiment of this application may comprise: a processor configured to generate a request primitive enabling a wake-up radio (WUR) scanning process for WUR discovery frames transmitted by one or more access points (APs), the request primitive comprising a plurality of first parameters; conduct the WUR scanning process based on the plurality of the first parameters; generate, at a MAC layer, at least one confirm primitive based on a result of the WUR scanning process and at least a part of the plurality of first parameters; and communicate, from the MAC layer to a SME, the at least one confirm primitive.

The following description will describe the process at 201 in detail.

The request primitive may be a MLME primitive which may be defined and used for WUR scanning. In an embodiment, the request primitive may be a MLME-WUR-SCAN.Request primitive. For example, a WUR scan may be initiated by an MLME primitive, such as a MLME-WURSCAN.Request primitive. This MLME primitive may request a survey of potential BSSs through WUR discovery frames that the WTRU can later elect to try to join. It should be noted that in this application, unless otherwise indicated, the terms "MLME-WURSCAN.Request primitive", "MLME-WURSCAN.Request", and "request primitive" may be used interchangeably. Those parameters in request primitive (e.g., the MLME-WURSCAN.Request primitive) will be described below with reference to detailed embodiments.

In another embodiment, the request primitive may be a MLME-SCAN.Request primitive or a part of MLME-SCAN.Request primitive. The parameters in the MLME-SCAN.Request primitive may be similar to those parameters in the MLME-WURSCAN.Request primitive, and the parameters in the MLME-SCAN.Request primitive will be further described below. In this application, unless otherwise indicated, the terms "MLME-SCAN.Request primitive", "MLME-SCAN.Request", and "request primitive" may be used interchangeably. Those parameters in request primitive (e.g., the MLME-WURSCAN.Request primitive) will be described below with reference to detailed embodiments In an embodiment, the request primitive may be generated by a station management entity (SME). For example, the MLME-WURSCAN.request primitive may be generated by the SME for a WTRU to determine, using its WUR or a low power WUR mode, to scan for WUR discovery frames to determine if there are other BSSs that it can join. In an embodiment, the request primitive may be generated by a processor.

The wake-up radio (WUR) scanning process for WUR discovery frames transmitted by one or more APs is a scanning process for WTRUs to scan and thus discover suitable APs and BSS' for association. WTRUs will scan and discover WUR discovery frames transmitted from APs. A WUR discovery frame may comprise different fields, such as SSID, compressed SSID, compressed BSSID, channel information, etc.

The request primitive may comprise multiple first parameters. The multiple first parameters may comprise at least one of Basic Service Set identity (BSSID), BSSIDList, Service Set identity (SSID), SSIDList, CompressedBSSID, CompressedSSID, CompressedBSSIDList, CompressedSSIDList, DiscoveryChannel, DiscoveryChannelList, MinDiscoveryChannelTime, MaxDiscoveryChannelTime, ReceivedPowerThreshold, MaxScanningTime, WURScanningReportingPeriod (or WURScanningReportingTime), WURScanningMode, WURScanningReportingOption, or RequestWURresult. The following part will describe the above-mentioned parameters one by one.

A BSSID may indicate the BSSID of an desired AP or a desired BSS. In an embodiment, BSSID may identify the basic service sets that are 48-bit labels and conforms to MAC-48 conventions. The BSSID may be a wildcard BSSID (e.g. ff:ff:ff:ff:ff:ff). In an embodiment, there may be only one BSSID in the request primitive. In another embodiment, there may be multiple BSSIDs in the request primitive. The BSSID(s) may be included in a BSSIDList. In other words, a BSSIDList may contain information of one or more BSSIDs. For example, the BSSIDList may be a list containing multiple BSSIDs each of which may indicate a desired BSS or AP. Although some examples of the BSSID and the BSSIDList have been described above, they are not intended to be exclusive or be limiting to the present application. Any variant of the above embodiments of the BSSID and the BSSIDList may also be applied in this method and the WTRU according to this application, as long as they may help to realize the principle of the present application.

A SSID may be a Service Set Identifier of desired AP or BSS or SS. That is, a SSID may indicate a Service Set to which the WTRU may desire to connect. SSID may be the wildcard SSID. In an embodiment, there may be only one SSID in the request primitive. In another embodiment, there may be multiple SSIDs in the request primitive. The SSID(s) may be included in a SSIDList. In other words, a SSIDList may contain information of one or more SSID of desired AP or BSS. For example, the SSIDList may be a list containing multiple SSIDs each of which may indicate a desire Service Set of AP or BSS. Although some examples of the SSID and the SSIDList have been described above, they are not intended to be exclusive or be limiting to the present application. Any variant of the above embodiments of the SSID and the SSIDList may also be applied in this method and the WTRU according to this application, as long as they may help to realize the principle of the present application.

A CompressedBSSID may indicate a compressed BSSID of a desired AP or a desired BSS, with which the WTRU may desire to associate. In an embodiment, the CompressedBSSID may be a partial BSSID. The CompressedBSSID may be associated with the wildcard BSSID. The associated CompressedBSSID may be computed based on the provided BSSIDs. In an embodiment, there may be only one CompressedBSSID in the request primitive. In another embodiment, there may be multiple CompressedBSSIDs in the request primitive. The CompressedBSSID(s) may be included in a CompressedBSSIDList. In other words, a CompressedBSSIDList may contain one or more compressed BSSIDs of desired APs or BSSs. For example, the CompressedBSSIDList may be a list containing multiple compressed BSSIDs each of which may indicate a desired BSS or AP. Although some examples of the CompressedBSSID and the CompressedBSSIDList have been described above, they are not intended to be exclusive or be limiting to the present application. Any variant of the above embodiments of the CompressedBSSID and the CompressedBSSIDList may also be applied in this method and the WTRU according to this application, as long as they may help to realize the principle of the present application.

A DiscoveryChannel may indicate a channel or a WUR channel on which Discovery frames (e.g., WUR discovery frames) may be scanned in a WRU scanning process. In an embodiment, there may be only one DiscoveryChannel in the request primitive. That is, Discovery frames may be scanned on a particular channel indicated by this DiscoveryChannel. In another embodiment, there may be multiple DiscoveryChannels in the request primitive. That is, Discovery frames may be scanned on multiple channels indicated by these DiscoveryChannels. The DiscoveryChannel(s) may be included in a DiscoveryChannelList. In other words, a DiscoveryChannelList may contain information of one or more DiscoveryChannels. For example, the DiscoveryChannelList may be a list containing multiple DiscoveryChannels each of which may indicate a channel or a WUR channel on which Discovery frames (e.g., WUR discovery frames) may be scanned in order to discover desired AP(s) or BSS(s). If the MLME-WURSCAN.request primitive includes one or more WURDiscoveryChannels, or WURDiscoveryChannelList, then the WTRU may only tune to these WUR Discovery Channels to scan for WUR Discovery frames. Although some examples of the DiscoveryChannel and the DiscoveryChannelList have been described above, they are not intended to be exclusive or be limiting to the present application. Any variant of the above embodiments of the DiscoveryChannel and the DiscoveryChannel List may also be applied in this method and the WTRU according to this application, as long as they may help to realize the principle of the present application. It should be noted that unless otherwise indicated, channel, WUR channel and discovery channel may be used interchangeably.

A MinDiscoveryChannelTime may indicate a minimum time in time units (TU) or other units for the WTRU to conduct WUR scanning on each of the channel(s) indicated by the DiscoveryChannel(s) in the DiscoveryChannelList. The MinDiscoveryChannelTime may be determined based on WUR Discovery periods of desired AP(s) or BSS(s) or SS(s). The WUR Discovery periods may be pre-acquired knowledge or received over the air from one or more APs. Although MinDiscoveryChannelTime and its preferable embodiment have been described above, they are not intended to be exclusive or be limiting to the present application. Any available value of the MinDiscoveryChannelTime may also be applied in this method and the WTRU according to this application, as long as they may help to realize the principle of the present application.

A MaxDiscoveryChannelTime may indicate a maximum time in TU or other units for the WTRU to conduct WUR scanning on each of the channel(s) indicated by the DiscoveryChannel(s) in the DiscoveryChannelList. The MaxDiscoveryChannelTime may be determined based on WUR Discovery periods of desired AP(s) or BSS(s) or SS(s). The WUR Discovery periods may be pre-acquired knowledge or received over the air from one or more APs. Although MaxDiscoveryChannelTime and its preferable embodiment have been described above, they are not intended to be exclusive or be limiting to the present application. Any available value of the MaxDiscoveryChannelTime may also be applied in this method and the WTRU according to this application, as long as they may help to realize the principle of the present application.

A ReceivedPowerThreshold may indicate a threshold of a received power above which Discovery frame(s) (e.g., WUR Discovery frames) is processed. That is, only the Discovery frame(s) the received power of which is greater than the ReceivedPowerThreshold may be processed in the WUR scanning process. The Discovery frame(s) the received power of which is lower than the ReceivedPowerThreshold may be ignored in the WUR scanning process. In an embodiment, the ReceivedPowerThreshold may be defined in terms of received channel power indicator (RCPI), received signal strength indication (RSSI), signal-to-noise ratio (SNR) and/or signal-to-interference-plus-noise ratio (SINR). Although ReceivedPowerThreshold and its preferable embodiment have been described above, they are not intended to be exclusive or be limiting to the present application. Any available value of the ReceivedPowerThreshold may also be applied in this method and the WTRU according to this application, as long as they may help to realize the principle of the present application.

A MaxWURScanningTime may indicate a maximum time in TU or other units for the WTRU to conduct the WUR scanning process. Although MaxWURScanningTime and its preferable embodiment have been described above, they are not intended to be exclusive or be limiting to the present application. Any available value of the MaxWURScanningTime may also be applied in this method and the WTRU according to this application, as long as they may help to realize the principle of the present application.

A WURScanningReportingPeriod (or a WURScanningReportingTime) may indicate the time or the period at which the results of WUR scanning process may be reported (e.g., by a MLME-WURScanning.confirm primitive). Although the WURScanningReportingPeriod and its preferable embodiment have been described above, they are not intended to be exclusive or be limiting to the present application. Any available value of the WURScanningReportingPeriod may also be applied in this method and the WTRU according to this application, as long as they may help to realize the principle of the present application.

A WURScanningMode may indicate the mode of the WUR scanning. For example, the values of the WURScanningMode may be "background", "concurrently with regular scanning", "WUR scanning only", etc. In other words, the mode of the WUR scanning indicated by the WURScanningMode may be "background", "concurrently with regular scanning", "WUR scanning only", etc. The above-mentioned mode of the WUR scanning will be further described below with reference to detailed embodiments. Although the WURScanningMode and its exemplary values have been described above, they are not intended to be exclusive or be limiting to the present application. Any available value of the WURScanningMode may also be applied in this method and the WTRU according to this application, as long as they may help to realize the principle of the present application.

A WURScanningReportingOption may indicate how the results of the WUR scanning process may be reported. That is, an option of reporting the results of the WUR scanning process may be indicated by the WURScanningReportingOption. The values of the WURScanningReportingOption may be "Immediate", "Periodic", "At Pre-determined Time", "Channel Specific", "At_Request", "At_End", etc. For example, if the WURScanningReportingOption parameter has a value of "Periodic" or "At_Specified_Time", a WURScanningReportingPeriod or WURScanningReportingTime as described above may be included in the same primitive (i.e., the request primitive) to indicate the time or periodicity at which the results of the WUR scanning process may be provided or reported. The above-mentioned options of reporting the results of the WUR scanning process will be further described below with reference to detailed embodiments. Although the WURScanningReportingOption and its exemplary values have been described above, they are not intended to be exclusive or be limiting to the present application. Any available value of the WURScanningReportingOption may also be applied in this method and the WTRU according to this application, as long as they may help to realize the principle of the present application.

RequestResults may indicate that the current results of the WUR Scanning process is being requested and should be provided by issuing a confirm primitive (e.g., a MLME-WURSCAN.confirm primitive).

Different first parameters which may be included in the request primitive have been described so far. It should be noted that the above-mentioned first parameters are only given by way of example, and they are not intended to be exclusive or be limiting to the present application. Any available parameters may be included in the request primitive, as long as they may help to realize the principle of this application.

The following part will describe the process at 202 in detail. As described above, the method 200 may comprise: at 202, conducting the WUR scanning process using WUR based on the plurality of the first parameters.

In an embodiment, as described above, after the SME or the processor generates the request primitive (e.g., the MLME-WURSCAN.request primitive), the processor may control the WTRU to initiate the WUR scanning process either immediately or after the current frame exchange sequence is completed. Then the WTRU may conduct the WUR scanning process based on the plurality of the first parameters in the request primitive.

Depending on the WURScanningMode parameter, for example, if its value is "background", then the WUR scanning process according to this application may be initiated as a background scanning. In that case, the WTRU may be conducting other type of operations.

If the value of the WURScanningMode parameter is "WUR scanning only", then the WUR scanning process may be initiated as a WUR scanning only. In that case, for example, the WTRU may turn off its main radio, and/or only conduct WUR scanning while in the low power WUR mode, and meanwhile, the WTRU may not conduct any other type of operations.

If the value of the WURScanningMode parameter is "concurrent with regular scanning", "concurrent with passive scanning/active scanning", then the WUR scanning process may be conducted as a concurrent discovery process together with regular scanning, active scanning/passive scanning, which may be indicated by the WURScanningMode parameter. For example, the WTRU may use its WUR to scan for WUR Discovery frames in the low power WUR mode, and meanwhile conduct passive or active scanning, for example, using the PCR or main radio.

As described above, different WUR scanning modes may be selected based on the WURScanningMode parameter. It should be noted that the WUR scanning process may be not the only scanning process performed by the WTRU in a given time period. That is, both non-WUR scanning process (e.g., active scanning process, passive scanning process, etc.) and WUR scanning process may be performed by the WTRU at the same time.

In another embodiment, the request primitive may be a MLME-SCAN.Request primitive or a part of MLME-SCAN.Request primitive. In an example, a WUR scanning process may be initiated by a MLME-SCAN.request primitive which may include one or more WUR scanning parameters. For example, any of the following parameters may be added into the MLME-SCAN.request primitive: BSSIDList, SSIDList, CompressedBSSID, CompressedSSID, CompressedBSSIDList, CompressedSSIDList, DiscoveryChannel, DiscoveryChannelList, MinDiscoveryChannelTime, MaxDiscoveryChannelTime, MaxScanningTime, ReceivedPowerThreshold, WURScanningMode, WURScanningReportingOption, RequestWURResult. These parameters may be as described herein and the procedures for initiating WUR scanning may be similar as described herein. Detail description of these parameters may be similar to as the same as those described with reference MLME-WURSCAN.request primitive above. Therefore, the detail description of these parameters will be omitted. The terms MLME-WURSCAN and MLME-SCAN may be used interchangeably (e.g., in the names of the primitives such as MLME-SCAN.request, MLME-SCAN.confirm, MLME-WURSCANSTOP.request, and/or MLME-WURSCANSTOP.confirm).

The following part of description will describe the process at 203. As described above, the method 200 may comprise: at 203, generating at least one confirm primitive based on a result of the WUR scanning process and at least a part of the plurality of first parameters.

The at least one confirm primitive may comprise one or more MLME-WURSCAN.confirm primitives, one or more MLME-SCAN.confirm primitives, or a combination of MLME-WURSCAN.confirm primitive(s) and MLME-SCAN.confirm primitive(s). For example, the at least one confirm primitive may comprise one MLME-WURSCAN.confirm primitive and one MLME-SCAN.confirm primitive. For another example, the at least one confirm primitive may comprise multiple MLME-WURSCAN.confirm primitives and no MLME-SCAN.confirm primitives. Although some examples of the at least one confirm primitive have been described above, they are not intended to be exclusive or be limiting to the present application. In some embodiments, the terms "MLME-SCAN.confirm primitive", "MLME-WURSCAN.confirm primitive", "confirm primitive" may be used interchangeably.

The at least one confirm primitive may be generated based on both (1) a result of the process at 202 and (2) a part of the plurality of first parameters. That is, on the one hand, the at least one confirm primitive may be generated based on the result of process at 202, i.e., the result of the WUR scanning process. On the other hand, the at least one confirm primitive may be generated based on a part of the plurality of first parameters. The part of the plurality of first parameters may comprise at least one of comprise WURScanningReportingOption, ReceivedPowerThreshold, CompressedBSSID, CompressedSSID, CompressedBSSIDList, CompressedSSIDList, or a combination of thereof. The following part of description will describe the part of the plurality of first parameters used to determine the confirm primitive in detail. In the following description, unless otherwise indicated, the confirm primitive and the MLME-WURSCAN.confirm primitive may be used interchangeably.

In an embodiment, the part of the plurality of first parameters may comprise the WURScanningReportingOption parameter. That is, the MLME-WURSCAN.confirm primitive may be generated based on the values of the WURScanningReportingOption. The WURScanningReportingOption may be used to determine a timing for generating the MLME-WURSCAN.confirm primitive. The following description will describe the relationship between the MLME-WURSCAN.confirm primitive and the WURScanningReportingOption, that is, how to generate the MLME-WURSCAN.confirm primitive based on a value of the WURScanningReportingOption.

For example, if the value of the WURScanningReportingOption is "Immediate", then the MLME-WURSCAN.confirm primitive may be generated each time a WUR Discovery frame is correctly received or detected.

If the value of the WURScanningReportionOption is "Channel_Specific", then the MLME-WURSCAN.confirm primitive may be generated after a particular WUR Discovery channel has been scanned for WUR Discovery frames, and may or may not have matching Compressed SSIDs or Compressed BSSIDs as indicated in the MLME_WURSCAN.rquest. In this case, the WUR Discovery channel may be one or more WUR Discovery Channels indicated in the MLME_WURSCAN.request.

If the value of the WURScanningReportingOption is "At_Request", then the MLME-WURSCAN.confirm primitive may be generated if the MLME-WURSCAN.request has been generated with a RequestResults parameter, or with the RequestResults parameter a value of which has been set to 1, to provide results of the current WUR scanning procedure.

If the value of the WURScanningReportingOption is "At_End", then the MLME-WURSCAN.confirm primitive may be issued at the end of the current WUR scanning procedure after the WUR scanning has been completed on one or more WUR Discovery channels, which may be indicated in the MLME-WURSCAN.request primitive.

If the value of the WURScanningReportionOption is "Periodic" or "At_Time", then the MLME-WURSCAN.confirm primitive may be generated every period or at a certain time, which may be indicated in the MLME-WURSCAN.request primitive.

In an embodiment, the part of the plurality of first parameters may comprise at least one parameter of SSID, SSIDList, BSSID, BSSIDList, CompressedSSID, CompressedSSDList, CompressedBSSID or CompressedBSSIDList. That is, the MLME-WURSCAN.confirm primitive may be generated based on the values of at least one parameter of SSID, SSIDList, BSSID, BSSIDList, CompressedSSID, CompressedSSDList, CompressedBSSID or CompressedBSSIDList. The following description will describe the relationship between the MLME-WURSCAN.confirm primitive and the above-mentioned parameter(s), that is, how to generate the MLME-WURSCAN.confirm primitive based on value(s) of the above-mentioned at least one parameter.

For example, the MLME-WURSCAN.confirm primitive may be generated if a WUR Discovery frame with a matching SSID, BSSID, Compressed SSID or Compressed BSSID has been received. In another example, if one or more CompressedBSSIDs or CompressedSSIDs have been provided in the request primitive (e.g., the MLME-WURSCAN.request primitive), then the MLME-WURSCAN.confirm primitive may be generated if a WUR Discovery frame has been received with a matching compressed SSID or a matching compressed BSSID. For example, if in the received WUR Discovery frame, the Transmitter ID contained in the ID field matches the 12 least significant bits (LSB) of the desired compressed BSSID and the Type dependent field contains the 12 MSB of the desired compressed BSSID, then there may be a matching compressed BSSID, and then, the MLME-WURSCAN.confirm primitive may be generated. If the MLME-WURSCAN.request includes one or more of CompressedBSSID, CompressedSSID, CompressedBSSIDList, CompressedSSIDList, then only BSSs with matching CompressedBSSID or CompressedSSID (or part thereof) may be reported.

In an embodiment, the part of the plurality of first parameters may comprise the ReceivedPowerThreshold parameter. That is, the MLME-WURSCAN.confirm primitive may be generated based on a value of the ReceivedPowerThreshold. For example, if the MLME-WURSCAN.request primitive includes a ReceivedPowerThreshold, then the MLME-WURSCAN.confirm primitive may be generated only for BSS(s) whose WUR Discovery frames have been received by the WTRU with a received power greater than the given ReceivedPowerThreshold. That is, if a received power of WUR Discovery frames is greater than the given ReceivedPowerThreshold, then BSS(s) transmitting the WUR Discovery frames may be reported by the MLME-WURSCAN.confirm primitive.

The following description will describe the content of the confirm primitive according to the present application. The confirm primitive (e.g., the MLME-WURSCAN.confirm primitive) may be used to return the descriptions of the set of BSSs detected by the WUR scanning process (e.g., by receiving one or more WUR Discovery frames). In an embodiment, multiple MLME-WURSCAN.confirm primitives may be generated when the value of the WURReportingOption is "Channel_Specific", "At_Request", or "Periodic" or "At_Specified_Time". In another embodiment, a single MLME-WURSCAN.confirm primitive may be generated.

In an embodiment, at least one confirm primitive may be generated and each of the at least one confirm primitive may comprise a plurality of second parameters. The plurality of second parameters may comprise at least one parameter of BSSDescriptionFromWURDFSet, ResultCode, ScannedWURDiscoveryChannelList, or VendorSpecificInfo. The BSSDescriptionFromWURDFSet parameter may be present if dot11WUROptionImplemented or dot11WURActivated is true. The following description will describe the above-mentioned second parameters in the confirm primitive in detail.

In an embodiment, there may be one or more BSSDescriptionFromWURDFSets in the confirm primitive. Each BSSDescriptionFromWURDFSet may consist of one or more parameters, such as the example parameters shown in Table 1.

TABLE 1 parameters of BSSDescriptionFromWURDFSet

| Name | Type | Description |
| --- | --- | --- |
| Transmitter ID | 12 bits ID | The transmitter ID is included in the ID field of the WUR Discovery frame and may be the 12 bits LSB of the compressed BSSID. |
| Partial Compressed BSSID | 24 bits Partial Compressed BSSID | The Partial Compressed BSSID may consist of 12 LSB of the compressed BSSID (may be included in the ID field of the received WUR Discovery frame) and the 12 MSB of the compressed BSSID (may be included in the Type Dependent field of the received WUR Discovery frame). |
| 12 LSB Compressed BSSID | 12 LSB Compressed BSSID | The 12 LSB Compressed BSSID may consist of 12 LSB of the compressed BSSID (may be included in the ID field of the received WUR Discovery frame) |
| 12 MSB Compressed BSSID | 12 LSB Compressed BSSID | The 12 MSB of the compressed BSSID (may be included in the Type Dependent field of the received WUR Discovery frame). |
| Compressed SSID | The whole or partial compressed SSID | The whole or partial compressed SSID. E.g., the 16 bits LSB or MSB of the compressed SSID which may be obtained from the Compressed SSID field of the received WUR Discovery Frame |
| Operating Class | Operating Class field | The operating class of the primary channel of the AP transmitting the WUR Discovery frame |
| Channel | Channel field | The operating channel of the AP transmitting the WUR Discovery Frame operating in regular (non-WUR) mode. |
| Received Power | The received power of the WUR Discovery frame. | The received power of the WUR Discovery frame, e.g., RCPI or RSSI. |

The ResultCode may have at least one of the following example values: SUCCESS, INTERMEDIATE_SCAN_

RESULT, NOT_SUPPORTED, PARTIAL_WURSCAN, PERIODIC_SCAN_RESULT, REQUESTED_SCAN_RESULTS. In all these example values, "SCAN" may be replaced by "WURSCAN" to clarify that the results are WUR Scanning Results. The value of the ResultCode may depend on the reasons for the MLME-WURSCAN.confirm primitive being issued. The following description will describe the above example values of the ResultCode in detail.

The SUCCESS may be used if the WUR scanning process has been successfully performed. The INTERMEDIATE_SCAN_RESULT may be used if the WURReportingOption parameter in the MLME-WURSCAN.request primitive is Channel_Specific or Immediate. The ResultCode value may be set to PARTIAL_SCAN if not all WUR Discovery Channels are scanned. The ResultCode value may be set to PERIODIC_SCAN_RESULT if the WURReportingOption parameter in the MLME-WURSCAN.request primitive is Periodic or At_Requested_Time. The ResultCode value may be set to REQUESTED_SCAN_RESULTS if WURReportingOption parameter in the MLME-WURSCAN.request primitive is At_Request and a MLME-WURSCAN.request primitive has been received with RequestWURResult.

It should be noted that the above-mentioned example values of the ResultCode are only given by way of example, and they are not intended to be exclusive or be limiting to the present application. Any available values of the ResultCode may be applied to the method and the WTRU according to the present application, as long as they may help to realize the principles of this application.

The ScannedWURDiscoveryChannelList may contain the list of WUR Discovery Channels that have been scanned.

In an embodiment, WUR SCAN Results may be reported by a MLME-SCAN.confirm primitive or as a part of a MLME-SCAN.confirm primitive. That is, the MLME-SCAN.confirm primitive may be used to return the descriptions of the set of BSSs or APs detected by the WUR scanning process (e.g., by receiving one or more WUR Discovery frames). Multiple MLME-SCAN.confirm primitives may be issued when the value of the WURReportingOption is "Channel_Specific", "At_Request", "Periodic" or "At_Specified_Time". Otherwise, a single MLME-SCAN.confirm primitive may be issued. The MLME-SCAN.confirm primitive may include any one of the following example parameters: BSSDescriptionFromWURDFSet, ResultCode, ScannedWURDiscoveryChannelList, or VendorSpecificInfo. The example parameters may be the same as or similar to those parameters described with reference to the MLME-WURSCAN.confirm primitive. Therefore, detailed description of the example parameters in the MLME-SCAN.confirm primitive will be omitted. In this application, unless otherwise indicated, the terms MLME-WURSCAN and MLME-SCAN may be used interchangeably. Accordingly, unless otherwise indicated, the terms MLME-SCAN.request and MLME-WURSCAN.request may be used interchangeably; the terms MLME-SCAN.confirm and MLME-WURSCAN.confirm may be used interchangeably; the terms "MLME-WURSCAN-STOP. Request", "MLME-WURSCAN-STOP. Request primitive", "MLME-SCAN-STOP.Request", "MLME-SCAN-STOP.Request primitive" and "stop request primitive" may be used interchangeably; and the terms "MLME-WURSCAN-STOP.confirm", "MLME-WURSCAN-STOP.confirm primitive", "MLME-SCAN-STOP.confirm", "MLME-SCAN-STOP.confirm primitive" and "stop confirm primitive" may be used interchangeably.

After the process at 203, the method 200 will proceed to the process at 204, i.e., communicating, from the MAC layer to the SME, the at least one confirm primitive.

Figure 2B:
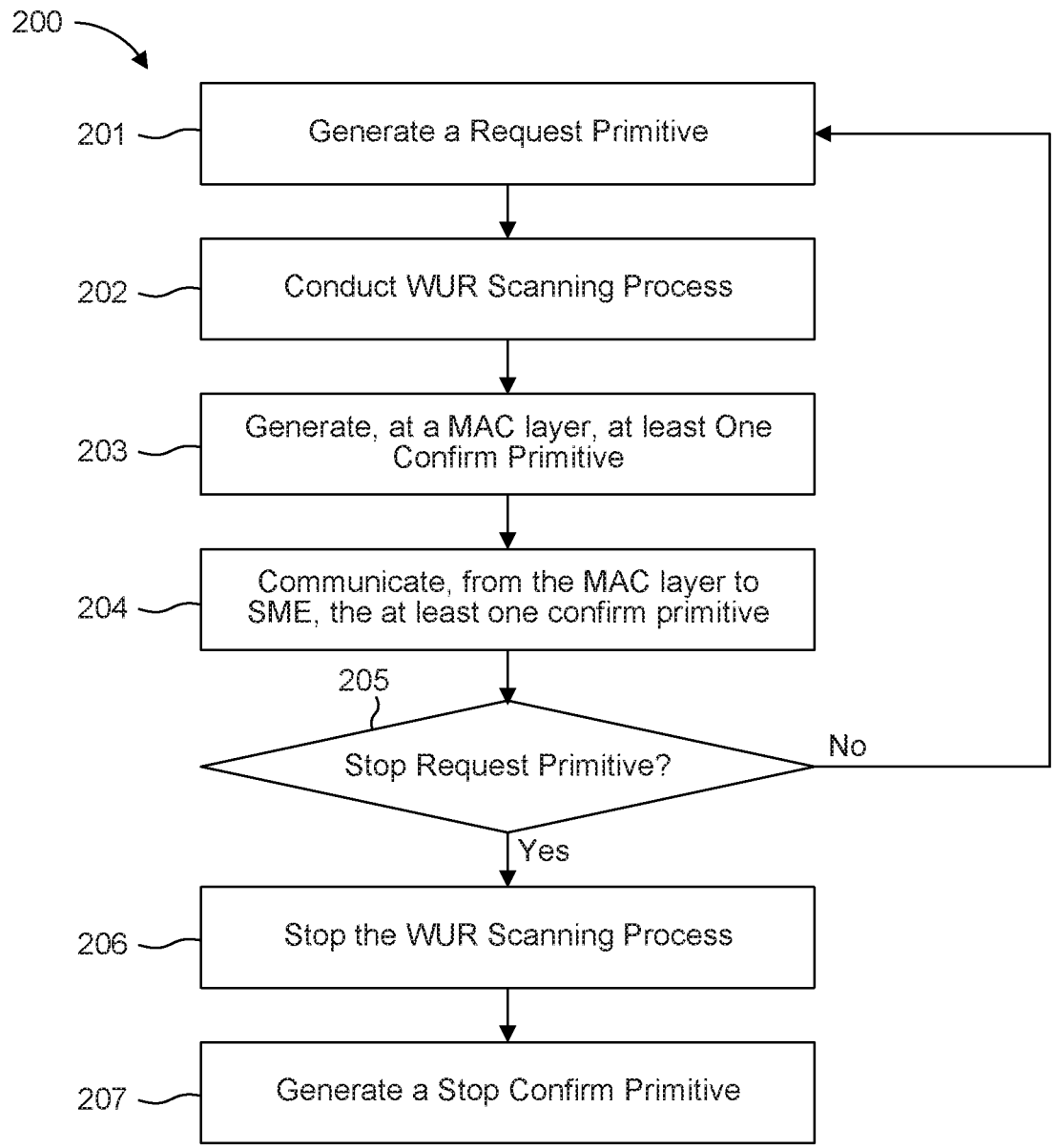
FIG. 2B is a flowchart illustrating a method according to another embodiment of this application.

The methods and WTRUs according to a second embodiment of this application will be described below with reference to FIG. 2B. As shown in FIG. 2B, the processes from 201 to 204 are similar to or the same as those processes described above with reference to FIG. 2B. The difference between the first embodiment and the second embodiment is that the method 200 shown in FIG. 2B comprises the processes from 205 to 207. To be more specific, the method 200 further comprises: at 205, detecting whether a stop request primitive has been generated for stopping the WUR scanning process, wherein on a condition that the stop request primitive has been generated, the method 200 further comprises: at 206, stopping the WUR scanning process; and at 207, generating a stop confirm primitive. The stop primitive may be generated before the first confirm primitive has been generated.

The following description will describe the processes at 205 and 207. In an embodiment, the stop request primitive may be a MLME-WURSCAN-STOP.request primitive which may terminate any ongoing WUR scanning process. For example, no matter what scanning mode in which the WTRU is performing a WUR scanning process based on the WURScanningMode parameter, the MLME-WURSCAN-STOP.request primitive may terminate such WUR scanning process. The primitive MLME-WURSCAN-STOP.request primitive may be generated by the SME in order to stop all ongoing WUR scan processes performed by the WTRU.

In another embodiment, the stop request primitive may be a WUR-SCAN-STOP.request primitive or a part of the WUR-SCAN-STOP.request primitive. The WUR-SCAN-STOP.request primitive may be used to terminate any ongoing WUR scanning process. The WUR-SCAN-STOP.request primitive may include one or more parameters, such as ScanType. As described above, multiple scanning processes (e.g., both WUR scanning process and non-WUR scanning process) may be performed by the WTRU at the same time. The ScanType parameter may indicate the type(s) of scan that the primitive may terminate. The ScanType parameter may have any one of the following values: WUR_Scan, Non-WUR_Scan, and All_Scan. If ScanType is WUR_Scan, then all ongoing WUR scanning processes may be terminated. If ScanType is Non_WUR_Scan, then non-WUR scanning processes may be terminated, including passive scanning process and active scanning process. If ScanType is All_Scan, then all ongoing scanning processes, including WUR scanning and non-WUR scanning (e.g., active scanning and passive scanning), may be terminated.

If the stop request primitive has been generated, then at 206, the corresponding scanning process(es) may be terminated based on the stop request primitive. That is, if the WTRU or its processor receives the stop request primitive, then the corresponding scanning process(es) identified by the stop request primitive may be terminated.

The following description will describe the process at 207. As described above, the method 200 may comprise: at 207, generating a stop confirm primitive.

In a first embodiment, the stop confirm primitive may be a MLME-WURSCAN-STOP.confirm primitive which may be used to indicate a successful termination of scanning process(es), such as WUR scanning process(es) and/or non-WUR scanning process(es). In a second embodiment, the stop confirm primitive may be a MLME-Scan-Stop.confirm primitive or a part of a MLME-Scan-Stop.confirm primitive. The MLME-Scan-Stop.confirm primitive may be used similarly to the MLME-WURSCAN-STOP.Confirm. In a third embodiment, the stop confirm primitive may be the MLME-WURSCAN.confirm primitive or the MLME-SCAN.confirm primitive described above. That is, the MLME-WURSCAN.confirm primitive or the MLME-SCAN.confirm primitive may be used for the same purpose of the MLME-WURSCAN-STOP.confirm.

The following description will describe a support for eBCS service according to this application.

There is a need for support for broadcast service for unassociated WTRUs. In addition, there is a need for uplink broadcast service in current WLAN standards. Designs are needed to support downlink broadcast service for WTRUs that are not associated, or for WTRUs that are receive-only and cannot transmit. Additionally, designs are needed for uplink broadcast by a WTRU to one or more APs. Broadcast service protocols and signaling may be designed to support WTRUs regardless of the WTRU's association status and to support uplink broadcast service by a non-AP WTRU to one or more APs.

Mechanisms for broadcast service support according to this application are described herein. A WTRU (e.g., an AP or a non-AP STA) that has dot11eBCSImplemented and/or dot11eBCSActivated may include a eBCS element in its beacon, or in a probe request/response and/(re)association request/response frames that the WTRU transmits. In an example, an eBCS element may be included in uplink (UL) and/or downlink (DL) broadcast information. In another example, an UL eBCS element may be included in UL broadcast information and/or a DL eBCS element may be included in DL broadcast information. It should be noted that in the present application, unless otherwise indicated, the terms DL broadcast element, DL eBCS element and DL broadcast capabilities element may be used interchangeably.

Figure 3:
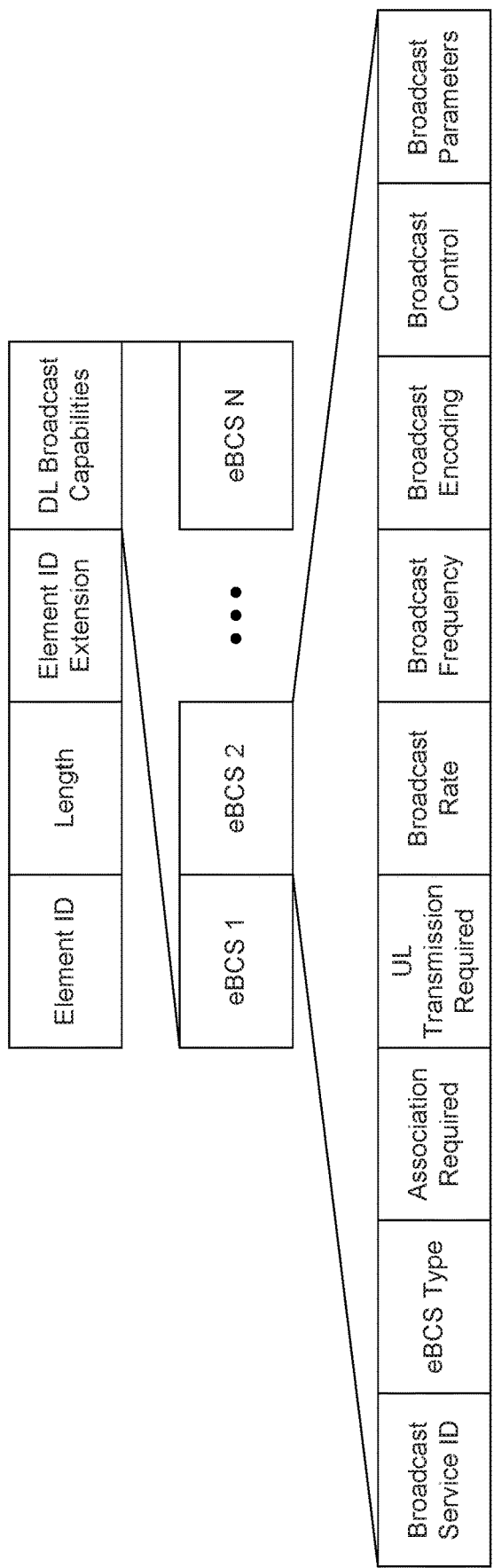
FIG. 3 shows an example design of a downlink (DL) broadcast element.

An example design of a DL broadcast element or DL eBCS element is shown in FIG. 3. The DL broadcast element may contain any one or more of the following example fields: Element ID; Length; Element ID Extension; and/or DL broadcast capabilities including N eBCS fields. The combination of the Element ID and the Element ID Extension may identify the current element as the DL broadcast element or the DL eBCS element. The Length field may indicate the length of the DL broadcast element.

The DL broadcast capabilities may include N fields (i.e., from eBCS 1 to eBCS N), such that each field may be used to specify a particular broadcast service that is provided by the transmitting WTRU (e.g., the transmitting AP). Each eBCS field may contain any one or more of the following example subfields: Broadcast Service ID, eBCS Type, Association Required, UL Transmission Required, Broadcast Rate, Broadcast Frequency, Broadcast Encoding, Broadcast Control, Broadcast Parameters, and/or Broadcast Status. The above-mentioned subfields will be further described as follows.

The Broadcast Service ID subfield may indicate the ID of the Broadcast service. The eBCS Type subfield may include the type of the broadcast service (e.g., whether the eBCS is UL or DL, or whether the broadcast service is of the category of automotive, direction, emergency, support, informational, and/or event_support). In an example, a bitmap may be included in the DL broadcast element to indicate which types of broadcast service are provided by the transmitting WTRU(s). The type may also be multi-AP broadcast. In another example, the broadcast type may be identified by an Organizationally Unique Identifier (OUI). The Association Required subfield may indicate whether association is needed to consume one or more broadcast services (e.g., the broadcast service identified by the Broadcast Service ID).

The UL Transmission Required subfield may indicate whether an UL transmission is required to consume one or more broadcast service (e.g., the broadcast service identified by the Broadcast Service ID). The Broadcast Rate subfield may indicate the data rate associated with the broadcast service. The Broadcast Frequency subfield may indicate the frequency at which the broadcast data is being transmitted. The Broadcast Encoding subfield may indicate the encoding of the broadcast data packets (e.g., inter-frame BCC binary convolutional code (BCC), inter-frame low-density parity-check (LDPC), Hybrid automatic repeat request (HARQ) convolution code (CC), HARQ incremental redundancy (IR)).

The Broadcast Control subfield may indicate how to control the broadcast service. For example, the Broadcast Control subfield may indicate that if a WTRU desires a certain broadcast service, the WTRU needs to directly negotiate with the transmitting WTRU (e.g., the transmitting AP) by using, for example, a Broadcast Request frame. In another example, the Broadcast Control subfield may indicate a server address (e.g., an IP address of a server) or a controller AP address (e.g., a MAC address or BSSID of another AP). Such a controller AP may be the master AP of a multi-AP set. The WTRU may also communicate with the controller AP or server to provide feedback of the broadcast service or negotiated rates, or the encoding. Example methods for control may be through WLAN, transmission control protocol/Internet protocol (TCP/IP), Broadcast Request negotiation, ANQP and/or generic advertisement service (GAS) frame exchanges.

The Broadcast Parameters subfield may include one or more broadcast parameters, including Offset, Channel, etc. For example, the Offset may indicate the offset of the start of the next broadcast packet, or broadcast bursts, which may be from the end of the current transmission, or from a target beacon transmission time (TBTT) or other reference points. The Channel may indicate the channel or OFDMA subchannels or resource units (RUs) on which the broadcast service packets may be available.

The Broadcast Status subfield may indicate the current broadcast status, such as Broadcasting, paused, or To be Initiated.

Figure 4:
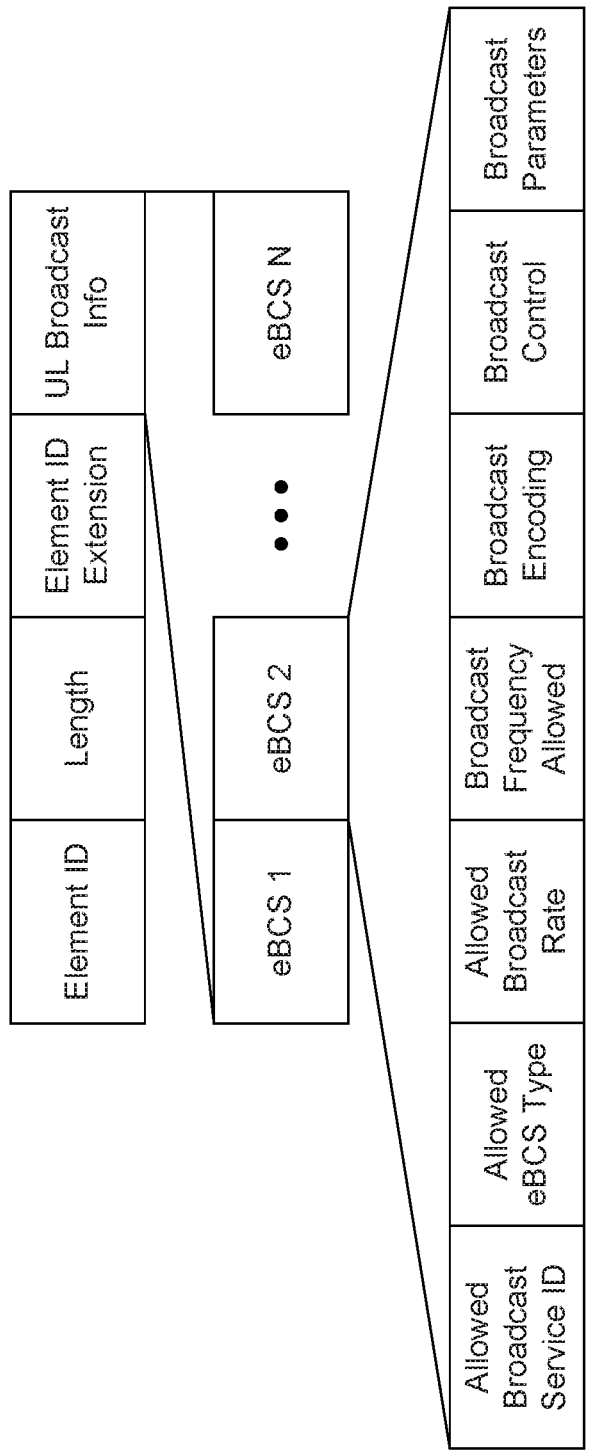
FIG. 4 shows an example design of uplink (UL) Broadcast element.

An example design of an UL broadcast element or UL eBCS element is shown in FIG. 4. The UL broadcast element may include any one or more of the following example fields: Element ID; Length; Element ID Extension; and/or UL broadcast information including N eBCS fields. It should be noted that in the present application, unless otherwise indicated, the terms UL broadcast element, UL eBCS element and UL broadcast capabilities element may be used interchangeably.

The combination of the Element ID and Element ID Extension may identify the current element as the UL broadcast element or as the UL eBCS element. The Length field may indicate the length of the UL broadcast element. The UL broadcast information may include N fields (i.e., from eBCS 1 to eBCS N), such that each field may be used to specify a particular UL broadcast service that is supported by the transmitting WTRU. Each eBCS field may contain any one or more of the following example subfields: Allowed Broadcast Service ID; Allowed eBCS Type; Association Required; DL Reception Required; Allowed Broadcast Rate; Broadcast Frequency Allowed; Broadcast Encoding; Broadcast Control; Broadcast Parameters; and/or Broadcast Status. The above-mentioned subfields will be further described as follows.

The Allowed Broadcast Service ID subfield may indicate the ID of the UL Broadcast service that is supported and allowed by the transmitting WTRU. The Allowed eBCS Type subfield may include the type of allowed broadcast service (e.g., whether the allowed eBCS is UL or DL, or whether the broadcast service is of the category of automotive, sensor, direction, emergency, support, informational, and/or event_support). In an example, a bitmap may be included in the UL broadcast element to indicate which types of broadcast service are allowed and supported by the transmitting WTRU(s). In another example, the broadcast type may be identified by an OUI or a server address. The Allowed eBCS Type subfield may include a detailed description of the provided broadcast service.

The Association Required subfield (not shown in FIG. 4) may indicate whether association is needed to utilize one or more allowed UL broadcast service (e.g., the broadcast service identified by the Allowed Broadcast Service ID). The DL Reception Required subfield (not shown in FIG. 4) may indicate whether DL Reception is needed in order to use one or more allowed UL broadcast service (e.g., the broadcast service identified by the Allowed Broadcast Service ID).

The Allowed Broadcast Rate subfield may indicate the allowed data rate for the WTRU(s) to transmit in the UL associated with the broadcast service. The Broadcast Frequency Allowed subfield may indicate the allowed frequency at which a WTRU is allowed to broadcast data in the UL associated with this allowed broadcast service. The Broadcast Encoding subfield may indicate the encoding to be used for the UL broadcast data packets, for example, inter-frame BCC, inter-frame LDPC, HARQ CC, HARQ IR.

The Broadcast Control subfield may indicate methods to control the UL Broadcast. For example, The Broadcast Control subfield may indicate how to control the broadcast service (e.g., indicate the destination of the allowed UL broadcast service). For example, it may indicate that if a WTRU desires to utilize a certain UL broadcast service, the WTRU needs to directly negotiate with the transmitting WTRU (e.g., the transmitting AP), by using, for example, a Broadcast Request frame. In another example, the Broadcast Control subfield may indicate a server address (e.g., an IP address of a server) or a controller AP address (e.g., a MAC address or BSSID of another AP). Such a controller AP may be the master AP of a multi-AP set. The server or the controller may be contacted by the WTRU that desires to utilize the uplink broadcast service to obtain feedback or to negotiate on MCSs to be used. For example, the method for control may be through WLAN, TCP/IP, Broadcast Request negotiation, ANQP or GAS frame exchanges.

The Broadcast Parameters subfield may include one or more broadcast parameters, including UL access, such as EDCA, Triggered Broadcast Access, Uplink OFDMA Random Access. For example, if the broadcast parameter is Triggered Broadcast Access, the WTRU utilizing the uplink broadcast service may only transmit the uplink broadcast packets if it is triggered by the AP. For example, the AP may trigger on one or more subchannels or RUs. In the trigger frame or triggering frame, it may be specified that uplink broadcast data is triggered and/or transmissions from unassociated WTRUs are triggered. If the broadcast parameter is Uplink OFDMA Random Access, the WTRU utilizing the uplink broadcast service may only transmit the uplink broadcast packets if it is triggered by a trigger frame or triggering frame triggering uplink random access on one or more RUs.

The Broadcast Status subfield may indicate the current broadcast status, such as Broadcasting, paused, or To be Initiated.

In an embodiment, the UL and DL Broadcast elements, as described above, may be combined into one broadcast element or eBCS element. In another embodiment, the information included in the UL and DL broadcast elements may be included as a part of ANQP element. In addition, any subset of UL and DL broadcast elements may be transmitted in any other type of frames, or any other type of elements, MAC and PHY headers, etc.

The DL Broadcast Procedure according to this application will be described as follows.

First, a WTRU (i.e., a non-AP WTRU) that desires a DL broadcast service may include a DL broadcast element in frames that it transmits, such as Probe Request frames, ANQP frames, or GAS inquiry frames. When transmitted by the WTRU, the DL broadcast element may indicate the information or parameters of desired DL broadcast service. In another example, a non-AP WTRU may include a DL broadcast request element which may include one or more subfields described for the DL broadcast element describing the desired DL Broadcast services.

Second, an AP may include a DL broadcast element or eBCS element in its beacon, Probe Responses, Association Responses, ANQP response frames or GAS response frames or any other type of frames. In an example, an AP may only include the DL broadcast element if it has received, from the WTRU, a frame that solicits DL broadcast element (e.g., when it has received a frame such as ANQP frame, GAS Query frame, or Probe Request frames that includes a DL broadcast element or eBCS element that indicates the desire of DL broadcast service). When transmitted by an AP, the DL broadcast element may indicate the DL broadcast services that are provided by the AP.

Third, the WTRU (i.e., the Non-AP WTRU) that receives the DL broadcast element may identify one or more desired broadcast services provided by the AP. The non-AP WTRU may follow the instructions indicated in the DL broadcast element, such as association if association is needed. If the Broadcast Status indicates the Broadcast service is currently being broadcasted, the non-AP WTRU may follow the Broadcast control and parameter information (e.g., tune to the right RUs, subchannels or channels at the correct offset to receive one or more broadcast services packets using the broadcast mode or encoding indicated).

If the Broadcast Status indicates that the Broadcast service is Paused or To Be Initiated, the non-AP WTRU may follow the instructions included in the DL broadcast element to resume or initiate the broadcast service. For example, if the Broadcast control should be "negotiate with the AP", the WTRU may associate with the AP and then conduct Broadcast Service request to the AP. In another example, the WTRU may not associate with the AP, but use ANQP query or GAS protocols to resume or initiate DL broadcast service. If the Broadcast Control is indicated as being "negotiate with the controller AP or Server" either through "WLAN" or "TCP/IP", the WTRU may associate with the controller AP and then conduct Broadcast Service request to the AP while indicating that the best AP for the broadcast service; or the WTRU may use TCP/IP connections to contact the server to resume or initiate the desired Broadcast service while indicating the best AP at which the broadcast service should be provided.

Then, the WTRU may use the broadcast control methods for further negotiation of broadcast services, such as feedback, encoding, modulation and coding scheme (MCS), and/or repetition.

The UL broadcast procedure according to this application will be described as follows.

First, a WTRU (i.e., a non-AP WTRU) that desires to utilize one or more UL broadcast services may include UL broadcast element in frames that it transmits, such as probe request frames, ANQP frames, or GAS inquiry frames. When transmitted by the non-AP WTRU, the UL broadcast element may indicate the information or parameters of desired UL broadcast services. In another example, a non-AP WTRU may include a UL Broadcast request element which may include one or more subfields described for the UL broadcast element describing the desired UL broadcast services.

Second, an AP may include a UL broadcast element or eBCS element in its beacon, Probe Responses, Association Responses, ANQP response frames or GAS response frames or any other types of frames. The AP may include the DL broadcast element if it has received, from the WTRU, a frame that solicits DL Broadcast element (e.g., when it has received a frame such as ANQP frame, GAS Query frame, or Probe Request frames that includes a UL Broadcast element or eBCS element that indicates the desire of UL Broadcast services). When transmitted by the AP, the UL broadcast element may indicate the UL broadcast services that are supported and allowed by the AP. The AP may provide policies regarding the supported and allowed UL broadcast service, such as allowed broadcast rate, allowed broadcast frequency, or allowed UL broadcast method, such as triggered Broadcast, Uplink OFDMA Random access, or EDCA.

If the Broadcast Status is Accepting Broadcast, then the non-AP WTRU may start broadcasting its UL data if it has received, from the AP, a frame (e.g., beacon, probe responses or association responses or FILS Discovery frames) that may include a UL broadcast element or eBCS element, in which the AP may indicate that it supports and allows that particular UL broadcast service. The WTRU may follow the instructions included in the UL broadcast element to conduct UL broadcast such as using the allowed Broadcast rate, Broadcast frequency, and/or uplink broadcast methods. If the Broadcast Status is Pause or To Be Initiated, the non-AP WTRU may use the Broadcast Control methods indicated to negotiate directly with the AP, or contact the controller AP or server, using the broadcast control methods (e.g., WLAN, TCP/IP) to resume or initiate the UL broadcast service that is provided by the AP.

Then, the WTRU may use the broadcast control methods for further negotiation of broadcast services, such as encoding, MCS, or repetition.

The following description will describe how to improve broadcast reliability according to this application.

Broadcast packets may be transmitted to multiple WTRUs, for example in the downlink case. Channel conditions, as well as device capabilities and sensitivities may vary from WTRU to WTRU. Consequently, the reliability for receiving a broadcast packet may not be the same across all receiving WTRUs. Broadcast reliability is particularly important for WTRUs that are not associated or cannot transmit. Thus, broadcast protocols and broadcast packets may be designed so that broadcast services are reliably provided to all WTRUs.

Mechanisms for improving broadcast reliability according to this application are described herein. An example mechanism for broadcast reliability is inter-frame encoding, such as BCC and LDPC. A broadcast node (e.g., an AP) may transmit frames that contain systematic or parity bits from previously transmitted frames, encoded and interleaved together. The data in the original frame may be BCC or LDPC encoded. In a first example, the data in the new subframes may comprise encoded data from previously transmitted frames that are linearly encoded together, which is referred to as inter-frame BCC or LDPC coding. In this case, the reliability of the additional bits after decoding becomes higher. In a second example, the data in the new subframes may comprise encoded data from previously transmitted frames that are concatenated and interleaved together. This can be described as partial frame HARQ. In this case, rather than the HARQ retransmission being transmitted by itself, it is transmitted together with HARQ retransmissions from other frames. This may help reduce the latency of the broadcast transmission. The following description will describe the above-mentioned two examples in detail.

Figure 5:
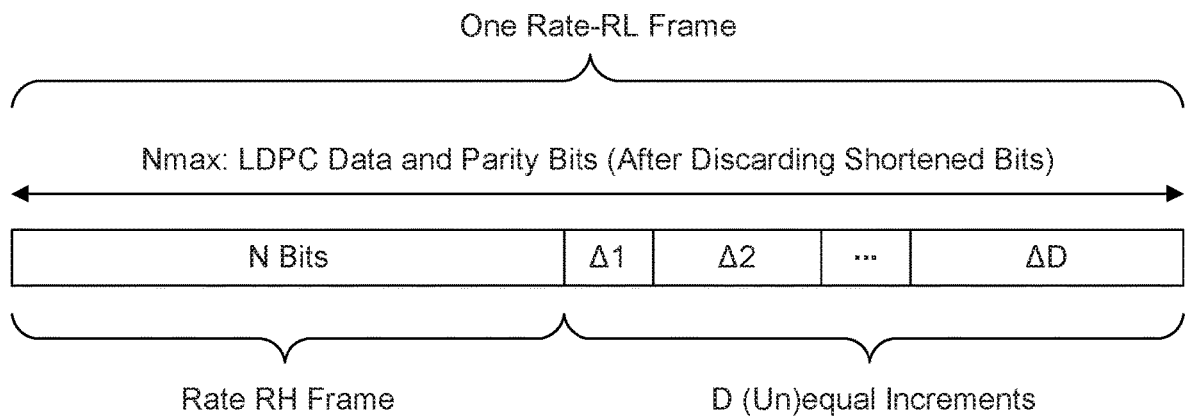
FIG. 5 shows an example of an LDPC interframe encoding with sequentially increasing increments.
Figure 6:
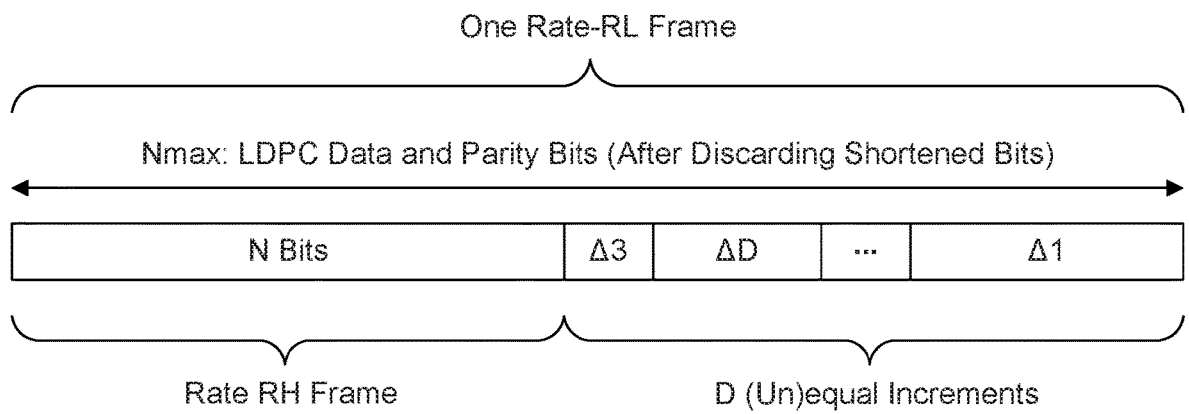
FIG. 6 shows an example of an LDPC interframe encoding with non-sequentially increasing increments.

FIG. 5 and FIG. 6 show examples of an LDPC inter-frame encoding with sequentially increasing increments. As shown in FIG. 5, an LDPC inter-frame encoding procedure may start after the data bits and parity bits have been constructed by discarding the shortened bits in the LDPC encoding procedure, resulting in a packet with length Nmax. The Rate RH frame shown in FIG. 5 may comprise N bits, and the D (un)equal increments may comprise D incremental subframes from $\Delta 1$ to $\Delta D$.

Nmax may be determined based on the length of the packet to be sent (N), the number of incremental subframes (D) and their corresponding lengths ($\Delta_i$). Each incremental subframe may be set up to different lengths such that, $Nmax=N+\Sigma_{i=1}^{D} \Delta_i$. If the length of each incremental subframe is identical then $Nmax=N+D\Delta_i$. The original transmission for each frame will be the N bits (as shown in FIG. 5) while the incremental subframes (e.g., $\Delta 1$-$\Delta D$) may be made up from the additional (non-punctured) parity bits. In the example shown in FIG. 6, the indices of the increments may be random and may not increase in sequence.

Figure 7:
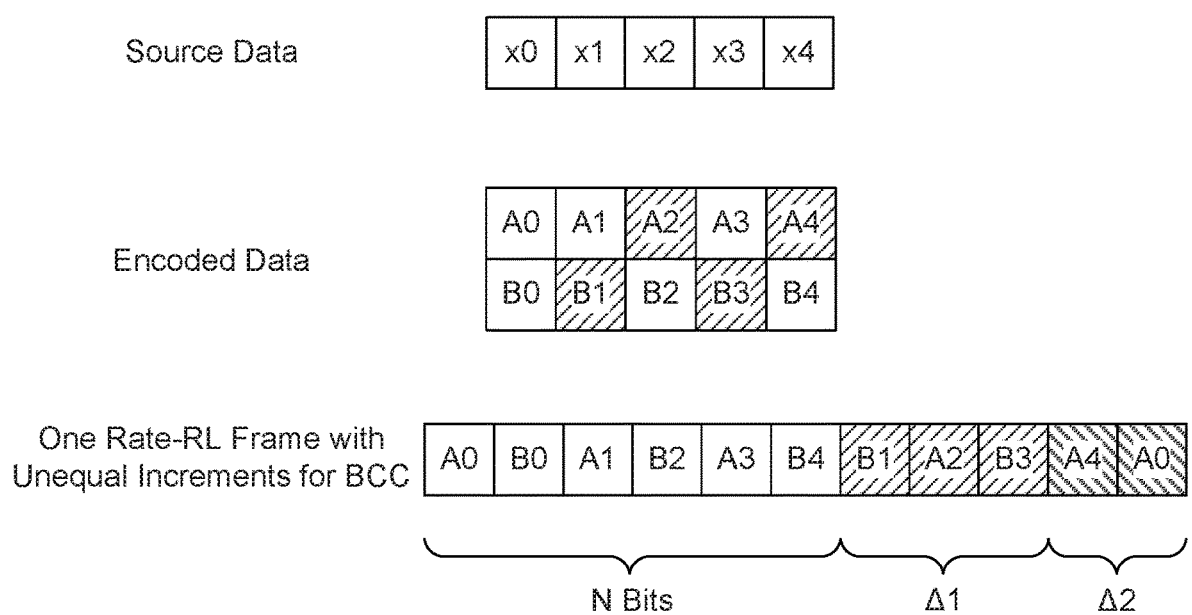
FIG. 7 shows an example of BCC interframe encoding.

FIG. 7 shows an example of BCC inter-frame encoding. In the case of BCC interframe encoding, for BCC transmission, the original transmission for each frame has N non-punctured bits (e.g., N bits shown in FIG. 7) and the incremental subframes (e.g., $\Delta 1$ and $\Delta 2$ shown in FIG. 7) may be made up from other punctured bits. As illustrated in FIG. 7, the Source data may comprise x0, x1, x2, x3, and x4; the Encoded Data may comprise A0-A4 and B0-B4; the one rate-RL frame with unequal increments for BCC may comprise N bits (comprising A0, B0, A1, B2, A3, B4), A1 (comprising B1, A2, and B3), and A2 (A4 and A0).

Figure 8:
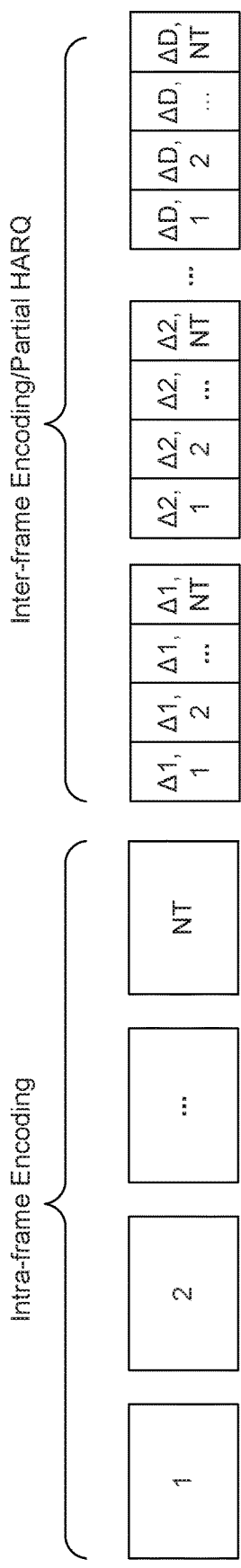
FIG. 8 shows an example of inter-frame encoding/partial HARQ with fixed indices.

Procedures may be defined for inter-frame BCC/LDPC transmission and partial packet HARQ for BCC/LDPC codes. FIG. 8 shows an example of inter-frame encoding and partial HARQ with fixed indices. The AP may define a transmission of NT+D frames (i.e., NT frames and D frames). The first NT transmissions (i.e., 1-NT) are intra-frame encoded frames made up of the N bits of each frame. As shown in FIG. 8, the intra-frame encoding comprises NT frames from 1 frame to NT frame. The last D transmissions are inter-frame encoded subframes made up of a combination of the D increments from each frame.

In an embodiment, the D subframe increments of each frame may be concatenated and then transmitted. This enables a partial HARQ transmission. In another embodiment, the D increments of each frame may be linear encoded using a specific encoding scheme.

For each transmitted frame, one or more of the following information may be signaled (e.g. in a PLOP header): intra-frame or interframe encoding, index of intra-frame encoding frame, index of inter-frame encoding frame (in the example below this may be the index a in delta(a,b), and/or may be signaled explicitly or identified implicitly based on the frame index after the start of the entire transmission), or indices of the frames encoded in the incremental subframe (in the example below this may be the index b in delta(a,b) and/or may be signaled explicitly or identified implicitly based on the number of frames in the transmission). In the case where the indices may be of different sizes, the size of the increments from each frame in the incremental subframe may be signaled.

Figure 9:
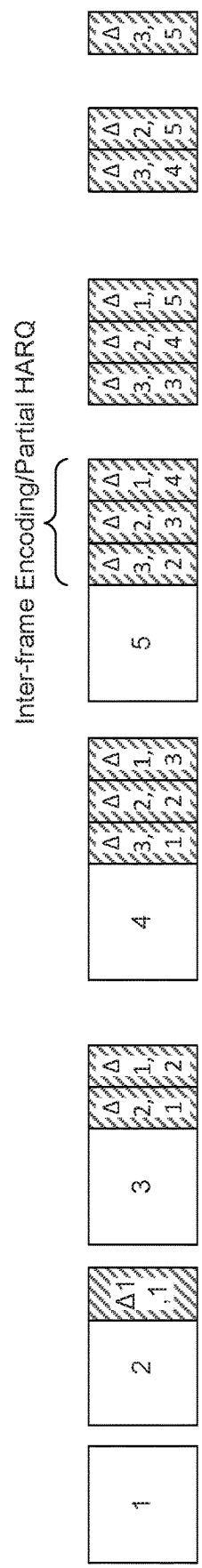
FIG. 9 shows an example of inter-frame encoding/partial HARQ with a sliding window.

FIG. 9 shows an example of inter-frame encoding and partial HARQ with a sliding window. As shown in FIG. 9, the incremental subframes may be aggregated (e.g. as an aggregated PPDU) onto the transmitted frames. For example, each frame may aggregate incremental subframes from the frames before it up to the maximum number of incremental subframes. As shown in FIG. 9, frame 2 aggregates the first incremental subframe (i.e., Δ1, 1) from frame 1. Frame 3 aggregates the second increment (i.e., Δ2, 1) from frame 1 with the first increment (Δ1, 2) from frame 2. Frame 4 aggregates increments from frames 1, 2 and 3. Frame 5 aggregates increments from frames 2, 3 and 4 as the value of D (the number of increments) is 3.

The increments transmitted may be dynamically selected, as illustrated in FIG. 10. For example, this approach may be used in the case where there may be feedback from the WTRUs on frames that have been poorly received. The broadcast AP may dynamically select specific frames to transmit incremental information. The broadcast AP may dynamically select the size of the increment to be sent based on the quality of the broadcast signal needed (some frames may need more protection than others). In an example, the WTRU(s) feedback indicates that a specific frame is very poorly received. For example, if most of the (elected) WTRUs indicate a frame was poorly received, then it may need more information. In another example, the WTRU may send more information on frames that may have been sent earlier to ensure that they get decoded faster to reduce overall latency.

A WTRU procedure may be defined as part of the inter-frame encoding. As part of an example WTRU procedure, an AP and a WTRU may exchange capability information on ability to receive inter-frame encoding. The capability information may include a maximum number of frames that may be decoded simultaneously. The AP may use the capability information to decide on the inter-frame encoding parameters for the broadcast channel. For example, the AP may set the number of simultaneous frames to the minimum indicated by all the receiving WTRUs (e.g., a set of discrete, pre-determined values and/or WTRU specific). The WTRU may receive a frame and decode a received PLOP header. The WTRU may identify that the received frame is inter-frame encoded. The WTRU may identify if the packet is intra-frame, inter-frame or both. If the packet is intra-frame encoded, the WTRU may decode the frame. If decoding is successful, the WTRU may send ACK to the AP on demand and/or terminate the decoding procedure for that frame. If the decoding is unsuccessful, the WTRU may store the frame in a buffer.

If packet is inter-frame encoded, the WTRU may decode/de-interleave/de-aggregate the incremental subframes in the frame. The WTRU may identify the incremental subframe based on explicit or implicit signaling. The WTRU may discard the incremental subframes of all the frames that have been successfully decoded. The WTRU may process the incremental subframes of all the frames that have not been decoded by adding the incremental subframe information received to the existing frame buffer and then decoding the results. If decoding is successful, the WTRU may send ACK to the AP on demand and/or terminate decoding procedure for that frame. If decoding is unsuccessful, the WTRU may store the frame in a buffer. The WTRU may send a NAK to the AP or wait until the total number of incremental subframes are received before sending the NAK. Because the channel is a broadcast channel, the ACK/NAK transmission may be based on a request by the AP to specific WTRUs and not all the WTRUs being transmitted to. In an example, the WTRUs may send an ACK/NAK on a specific (sub)channel and the presence of a signal on the subchannel may notify the AP that there is success/failure.

If the packet is both intra-frame and inter-frame encoded, the WTRU may separate the intra-frame packet from the inter-frame packet and then process each separately, using the approaches described above.

In HARQ broadcast, The broadcasted frame may be transmitted multiple times or in repetition. In an example procedure, the repeated transmission may be the same as the original transmission, so that the receivers may combine the receptions easily. Signaling may be used to enable the receiving WTRU to combine the received frames. One or more of the following information (fields) may be included in, for example, the PLOP header, MAC header, MAC body and/or Beacon frame: ID, broadcast, repetition transmission, repetition index, next repetition frame, or next repetition beacon. The above-mentioned fields will be further described as follows.

The ID field may indicate any of the destination ID, source ID, transmitter ID, receiver ID, broadcast ID, broadcast channel ID, and/or content ID. The broadcast field may be used to indicate whether this is a broadcast frame, a multicast frame and/or unicast frame. The repetition transmission field may be used to indicate whether this frame is transmitted in a repetitive way. The repetition transmission field may also indicate the type of repetition being used (e.g., simple repetition or inter-fame encoding).

The repetition index field may indicate the number of repetition for the current transmission. For example, the repetition index field may be transmitted in an increasing way. In another example, the repetition index field may be transmitted in a decreasing way, so that the receiving WTRUs may know the number of repetition transmissions that may follow. The next repetition frame field may indicate the expected time for the next repetition of the frame. The next repetition frame field may also indicate the type of repetition frame to be sent at that time. The next repetition beacon field may indicate the expected time for next repetition beacon. In an example, the expected time may be a duration.

In an embodiment, the broadcasted frame may be transmitted multiple times or in repetition method with some diversity schemes. For example, the repeated transmission may not be the same as the original transmission. In this case, one or more of the following approaches may be used.

In a first approach, different bit interleavers may be used for different repetitions. A bit interleaver may be used between BCC encoder and constellation mapper. In an example, multiple bit interleavers may be defined. For example, the number of bit interleavers may be the same as the maximum number of repetition allowed. In this case, one interleaver may be used for one repetition. In another example, a fixed number of interleaver may be defined. The mapping between interleaver index to repetition may be defined through a function. For example, the modular function may be used. The interleaver index used for kth repetition may be defined as Interleaver_ID=mod(k, N), where N is the maximum number of interleavers defined. A bit interleaver may or may not be used for LDPC codes. In an example approach, bit interleavers may be defined for repetition transmissions.

In a second approach, different symbol interleavers may be used for different repetitions. For example, a symbol level interleaver may be used right after constellation mapper. The use of symbol level interleaver may be to distribute the modulated symbol among an OFDM symbol. In an example, a fixed number of symbol interleaver may be defined. The mapping between interleaver index to repetition may be defined through a function. For example, the modular function may be used. The symbol interleaver index used for kth repetition may be defined as Interleaver_ID=mod(k, N), where N is the maximum number of symbol level interleavers defined.

In a third approach, different redundant version (RV) may be used for different transmissions. Different RV may be corresponding to different subset of coded bits. The mapping between RV index to repetition may be defined through a function. For example, the modular function may be used. The RV index used for kth repetition may be defined as RV_ID=mod(k, N), where N is the maximum number of RVs defined.

The diversity broadcast transmission may be signaled in PLOP header or MAC header or MAC body, and may include one or more of the following example fields: ID, broadcast, repetition transmission, maximum number of repetitions, repetition index, transmission index, or next repetition beacon/timing. The above-mentioned example fields will be further described as follows.

The ID field may indicate the destination ID, source ID, transmitter ID, and/or receiver ID. The broadcast field may be used to indicate whether this is a broadcast frame, a multicast frame and/or unicast frame. The repetition transmission field may be used to indicate whether this frame is transmitted in a repetition way. The maximum number of repetitions field may indicate the maximum number of repetitions expected. The repetition index field may indicate the number of repetition transmissions for the current transmission. In an example, the repetition index field may be transmitted in a count up way. In another example, the repetition index field may be transmitted in a countdown way, so that the receiving WTRUs may know the number of repetition transmissions to follow.

The transmission index field may be used to signal the bit level interleaver index, symbol level interleaver index, and/or RV index used in the following transmission. The next repetition beacon/timing field may indicate the expected time for next repetition beacon/timing. In an example, the expected time may be a duration. This duration may be a function of the capabilities of the WTRU to allow each WTRU to decode each transmission independently. In another example, the expected time may be immediate indicating that the next repetition occurs an interframe spacing (xIFS) duration after the conclusion of the current transmission.

Procedures may be used for power saving with broadcast service (BCS) reception. A WTRU may receive a PLOP header with a repetition ID. In an example, the PLOP header may contain the total number of repetitions as well as the repetition index. The WTRU may save all the repetitions and decode after the last reception. The WTRU may decode after each repetition. The AP(s) and WTRU(s) may negotiate the minimum inter-repetition duration to allow for decoding the packet after each repetition.

Figure 11:
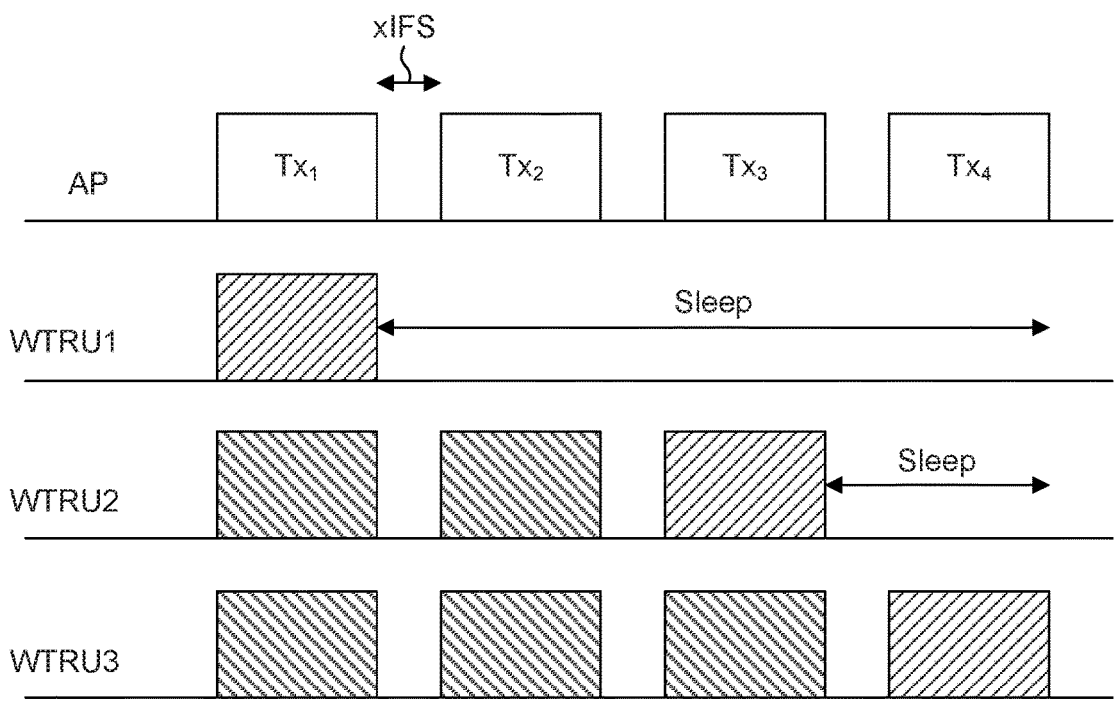
FIG. 11 shows an example power saving procedure with xIFS inter-frame spacing between repetitions for BCS.

If the WTRU has decoded the packet, it may go to sleep for the duration of the transmission. FIG. 11 shows an example power saving procedure with xIFS inter-frame spacing between repetitions, which may be used for BCS. For example, as shown in FIG. 11, the WTRU1 decoded the packet during Tx1, and then it may sleep until Tx4.

Figure 12:
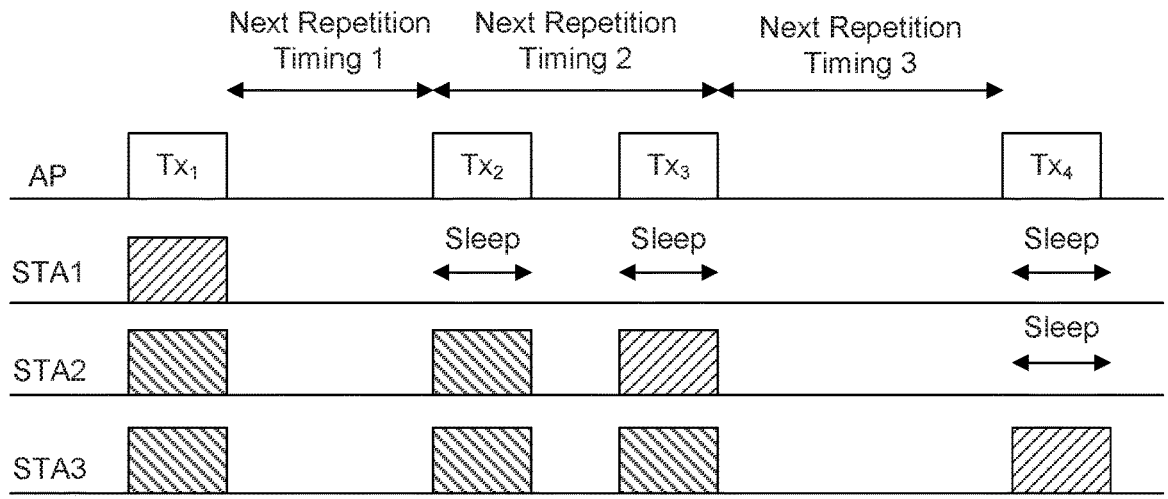
FIG. 12 shows an example of a power saving procedure with specific timing differences between repetitions.

If the WTRU has decoded the packet, and the inter-repetition duration is immediate, the WTRU may go to sleep for the duration of the specific repetitions. FIG. 12 shows an example of a power saving procedure with specific timing differences between repetitions, which may be used for BCS. For example, as shown in FIG. 12, the WTRU1 decoded the packet during Tx1, then it may sleep during Tx2, Tx3 and Tx4.

In an embodiment, feedback based repetition transmission may be used. A maximum number of repetition transmission may be predefined or (re-)determined. The maximum number of repetition transmission may be carried and signaled in beacon frames, (re)associate frames, probe request/response frames, or any other type of management/control frames. A WTRU (e.g., an AP WTRU or a non-AP WTRU) may not always reach the maximum number of repetition transmissions. The WTRU may terminate the repetition transmission based on feedback. For example, if the WTRU receives a positive acknowledgement (ACK) from another WTRU that may be far away from the WTRU, the WTRU may stop repetition.

In an embodiment, the repetition transmissions may be separated by at least a predefined inter-frame space xIFS. In one method, the xIFS may be bigger than short interframe space (SIFS) or distributed interframe spacing (DIFS). In an embodiment, the inter-frame spacing between each retransmission may be dynamic and configurable. A receiving WTRU, under some condition may reply a positive acknowledgement if the WTRU received the repetition broadcast transmission(s) successfully. The acknowledgement may be transmitted before a next repetition, so that the broadcasting WTRU may receive it before transmitting the next repetition. The broadcasting WTRU may determine if it may terminate the repetition transmission. In an embodiment, a group of WTRUs may be allowed to transmit the acknowledgement. For example, the broadcasting WTRU may determine a group of WTRUs which may be far away from itself. The broadcasting WTRU may indicate in a management frame or a control frame that the group of WTRUs may be allowed to transmit acknowledgement between repetition broadcast transmissions. The group of WTRUs may transmit the exact the same acknowledgement back concurrently so that they may be aligned at the receiver side and the receiver may be able to decode it.

In an embodiment, a polling frame or a MU-BAR frame may be transmitted before or after a repetition transmission. Alternatively, a NDP trigger frame may be aggregated with the broadcast frame. The polling frame, MU-BAR frame or NDP trigger frame may trigger acknowledgement transmissions from one or multiple WTRUs. The receiving WTRU, which may be polled or triggered, may reply a positive acknowledgement if it received the repetition broadcast transmission(s) successfully. The broadcasting WTRU may receive the positive acknowledgement and determine if it may terminate the repetition transmission.

The broadcasting WTRU may determine whether it may terminate the repetition. Or the broadcasting WTRU or the AP may configure whether a broadcasting WTRU may terminate the repetition. In an embodiment, the configuration may be based on if the broadcasted frame may target associated WTRUs or unassociated WTRUs. If the frame may be transmitted to unassociated WTRUs or partially to those unassociated WTRUs, the broadcasting WTRU may not terminate the repetition transmissions early.

Figure 13:
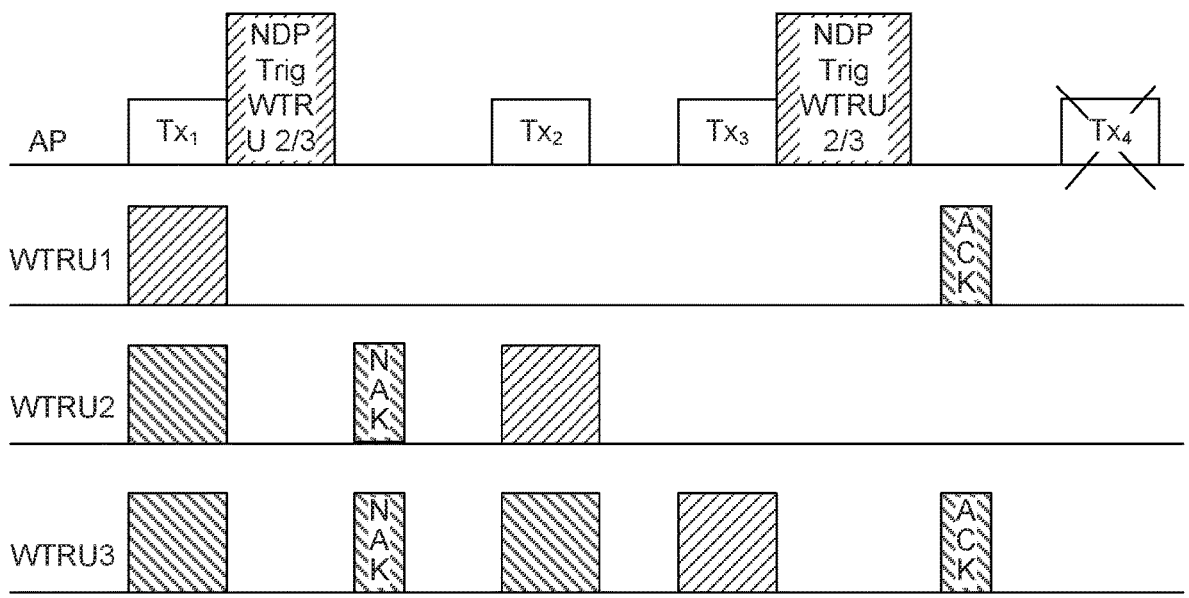
FIG. 13 shows an example of repetition transmission with feedback.

The number of maximum repetitions may be determined by the AP or specified otherwise. The AP may broadcast the number of maximum repetitions in its beacon, association request/response, probe request/response frame or other type of control/management frames. In an embodiment, the AP may determine to use a bigger maximum repetition number if the coverage range of the BSS may be big or the AP may know many cell edge WTRUs. Otherwise, the AP may use a smaller maximum repetition number. FIG. 13 shows an example of repetition transmission with feedback. As shown in FIG. 13, during Tx1, the WTRU1 received transmission from the AP, but the WTRU2 and the WTRU3 did not received the transmission. Therefore, the WTRU2 and the WTRU3 may send NAKs to the AP. Then, a repetition of transmission may be performed during Tx2. Then, the WTRU2 successfully received the transmission. But, the WTRU3 did not receive. Then, a repetition of transmission may be performed during Tx3. Then, the WTRU3 received the transmission.

Figure 14:
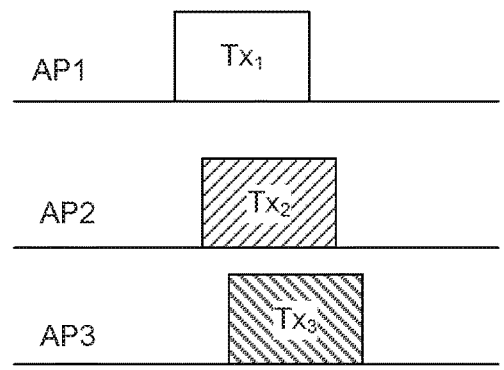
FIG. 14 shows an example of multi-AP broadcast with CSD.
Figure 15:
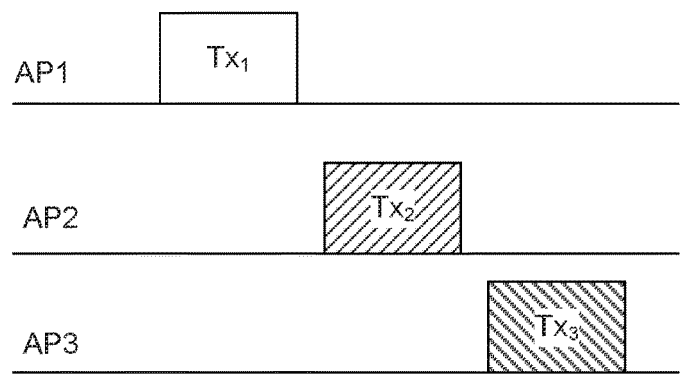
FIG. 15 shows an example of multi-AP broadcast with timing separation.
Figure 16:
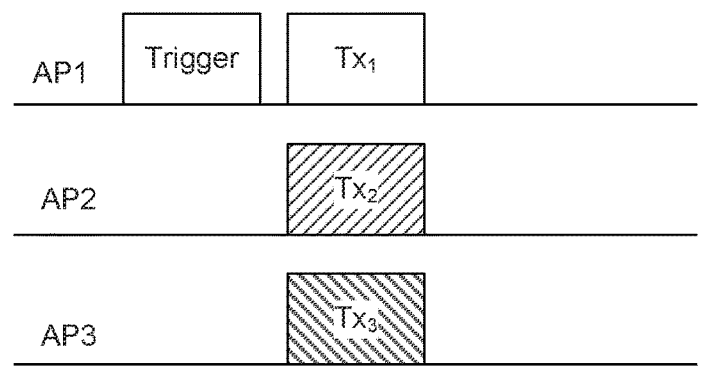
FIG. 16 shows an example of multi-AP broadcast with a spatial transmit diversity scheme.

In an embodiment, multi-AP broadcast transmission may be used for reliability. WTRUs may associate with a single or multiple APs (associated WTRUs). APs may send out to a set of APs for broadcast (associated and unassociated WTRUs). The APs may identify broadcast resource (e.g., entire band, defined RU). The APs may send out a broadcast channel (BC) transmission scheme. For example, the APs may send cyclic shift diversity (CSD) with indication of the AP ID, corresponding shift and/or cyclic prefix (CP). The APs may send CSD with a same shift and CP. The APs may send time slot based transmission (e.g., time shift with timing index). The APs may use a "JT" method (e.g. suffix tree clustering (STC) method and index). FIG. 14 shows an example of multi-AP broadcast with CSD. FIG. 15 shows an example of multi-AP broadcast with timing separation. FIG. 16 shows an example of multi-AP broadcast with a spatial transmit diversity scheme (e.g., space-time block code (STBC)).

In an embodiment, repetition transmission may be used for broadcast/multicast frames. For example, repetition transmission for broadcast/multicast frames may be used with: different self-decodable RVs, different bit level interleaver, different symbol level interleaver (equivalent to change subcarrier mapping), and/or with SIG indicating broadcast, PAID (e.g., association ID), RV, HARQ, interleaver ID, and/or next timing.

In an embodiment, feedback based repetition transmission may be used. For example, repetition transmission may be separated with at least a fixed duration (e.g., xIFS). xIFS may be bigger than SIFS or DIFS. Feedback based repetition may include the use of polling/multi-user block-ACK request (MU-BAR). Some WTRUs may be allowed to transmit acknowledgement back before next the repetition, if the transmission successfully decoded. In an embodiment, pre-selected far away WTRUs may transmit the acknowledgement (e.g., using a near-far procedure in 802.11 ay). The AP that receives the acknowledgement successfully may terminate the transmission in some cases. The AP may complete the full repetition periodically to unassociated WTRUs. The BCS transmission parameters (for associated WTRUs) may be generalized, and/or the TCP/IP may be configured for unassociated/non-transmitting WTRU through probe request(s). An ACK may specify WTRUs, group of WTRUs, null data packet (NDP) feedback report, and/or random access MU.

If a subnet of APs is configured to send the same broadcast information from multiple APs with or without automatic repeat (AR) configured for the frames being sent, a WTRU receiving these transmitted frames must be able to identify the frames that contain the same broadcast data or an incremental redundancy version of the broadcast data. In that case, the WTRU can improve its reception of the broadcast data by combining the frames, where appropriate, or ignoring redundant frames containing data already received. For the case where the AR is a simple repeat (sending a redundant version of the same frame from multiple APs) the WTRU must have a means of knowing if it has already received the data to ignore the redundant frames or if it has not received the data. The WTRU should know how to combine the frames to increase the likelihood that the data can be received. For the case where the AR has incremental redundancy (IR) frames, the WTRU must have a means of knowing how it should combine the incremental redundant frames, combine frames with identical data, and ignore frames containing data that has already been received. Currently there is no method of informing the WTRU that frames being sent by different APs contain the same broadcast data or IR version of the data the WTRU is trying to receive.

The following description will describe a subnet scheduling to address the issues discussed above.

A subnet of APs may be configured to broadcast the same information from multiple APs. Such a subnet may use methods to inform WTRUs that the broadcast from the multiple APs contain broadcast data. As each AP is a unique source of transmission, multiple methods may be employed. In an example method to inform a WTRU of broadcast data, the subnet of APs may coordinate to use the same broadcast ID information. The APs may use one or more of the following information fields (e.g., in a PLOP header, MAC header, MAC body and/or beacon frame) to provide the broadcast ID information: multi-AP indicator, subject ID, ID, broadcast, repetition transmission, repetition index, next repetition frame, or next repetition beacon. The above-mentioned fields will be further described as follows.

The multi-AP Indicator field may indicate that the frame as well as its associated ID(s) is being broadcast by multiple APs. The Subnet ID field may provide a unique ID for the subnet, and all APs in the subnet may use the same identifier. Subnets may coordinate to ensure that different subnets with overlapping service areas have unique subnet IDs. In an example, the subnet ID may be based on the MAC address of one of the APs in the subnet. In another example, a hash of the SSID, a hash based on the AP's location, a unique subnet ID assigned by the network/subnet administrator, or any other unique ID may be used.

The ID field may indicate destination ID, source ID, transmitter ID, receiver ID, broadcast ID, broadcast channel ID, and/or content ID. The broadcast field may be used to indicate whether this is a broadcast frame, a multicast frame and/or unicast frame. The repetition transmission field may be used to indicate whether this frame is transmitted in a repetitive way. The repetition transmission field may also indicate the type of repetition being used (e.g. simple repetition or inter-fame encoding).

The repetition index field may indicate the number of repetition transmissions for the current transmission. In an embodiment, the repetition index field may be transmitted in a count up way. In another embodiment, the repetition index field may be transmitted in a countdown way, so that the receiving WTRU(s) may know the number of repetition transmissions to follow. The next repetition frame field may indicate the expected time for the next repetition of the frame. The next repetition frame field may also indicate the type of repetition frame to be sent at that time. The next repetition beacon field may indicate the expected time for next repetition beacon. In an example, the expected time may be a duration.

The APs may coordinate and choose a virtual SSID and/or a MAC address that all of the APs in the subnet will use for broadcast (e.g., a specific broadcast or a specific set of broadcasts). The APs in the subnet may all transmit the same SSID information (e.g., the virtual SSID and/or the MAC address). By transmitting the same SSID information, these APs will appear as a single broadcast AP to any WTRU receiving the broadcast frames sent by the APs in the subnet. The APs using the virtual SSID and/or the MAC address may use one or more of the following information fields (e.g., in the PLOP header, MAC header, MAC body, and/or Beacon frame) to provide the broadcast ID information: Virtual SSID indicator, Virtual MAC address, ID, broadcast, repetition transmission, repetition index, next Repetition frame, and/or next repetition beacon. The above-mentioned fields will be further described as follows.

The virtual SSID indicator field may be a single bit indicating that the SSID is a virtual SSID or it may be multiple bits providing information on the type of virtual SSID being indicated. The virtual MAC address field may be a single bit indicating that the AP MAC address is a virtual MAC address, or it may be multiple bits providing information of the type of virtual MAC address being indicated.

The ID field may indicate destination ID, source ID, transmitter ID, receiver ID, broadcast ID, broadcast channel ID, and/or content ID. The broadcast field may be used to indicate whether this is a broadcast frame, a multicast frame and/or a unicast frame. The repetition transmission field may be used to indicate whether this frame is transmitted in a repetitive way. The repetition transmission field may also indicate the type of repetition being used (e.g., simple repetition or inter-frame encoding).

The repetition index field may indicate the number of repetition transmissions for the current transmission. In an embodiment, the repetition index field may be transmitted in a count up way. In another embodiment, the repetition index field may be transmitted in a countdown way, so that the receiving WTRU(s) may know the number of repetition transmissions to follow. The next repetition frame field may indicate the expected time for the next repetition of the frame. The next repetition frame field may also indicate the type of repetition frame to be sent at that time. The next repetition beacon field may indicate the expected time for next repetition beacon. In an embodiment, the expected time may be a duration.

Procedures may be used for UL broadcast reliability. In DL broadcast there may be multiple transmitters and receivers, and each receiver may represent a broadcast service endpoint located inside a non-AP WTRU. This may make the MAC layer CSMA/ARQ protocol for broadcast data complicated because different transmitter-receiver pairs may have different success/failure status. For example, APs may need to know the identities of (unassociated) broadcast receivers to assign the feedback resources in the UL direction. Furthermore, APs may need to coordinate among themselves to know which MAC PDU (MPDU)/data-block is missing for at least one WTRU before the retransmission attempt.

Figure 17:
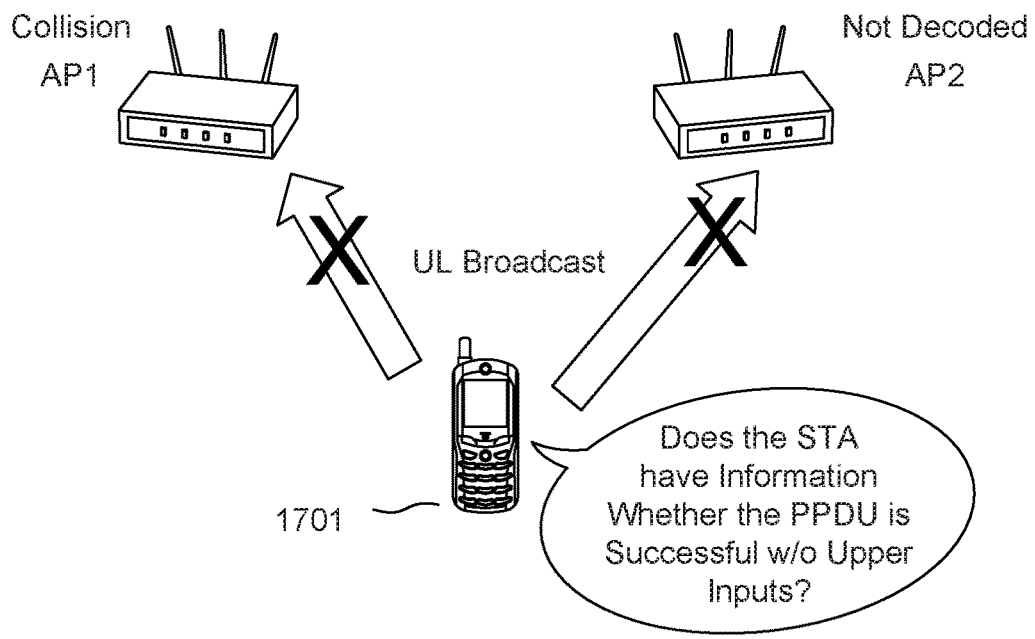
FIG. 17 shows an example network architecture where an UL WTRU (e.g., STA) is unaware of receiver status.

UL broadcast reliability may also be in an issue. As shown in FIG. 17, an UL WTRU 1701 is unaware of the receiver status (or statistics of received physical layer convergence procedure (PLOP) protocol data units (PPDUs) over a duration) which is shown as "Does the WTRU have information whether the PPDU is successful without upper inputs?" An example requirement for the transmitted data may be that lost data is not tolerable and retransmissions are needed for the lost data. In this case, without knowledge at the 802.11 protocol layer, the UL WTRU 1701 may need to have an association with a BSS (or a connection to another access) to have a unicast data connection to trigger the retransmission. Another example requirement for the transmitted data may be that lost data is tolerable but not desirable. In this case, the feedback from the receiver may improve the quality of PPDUs transmitted in the future.

In UL broadcast, different receivers of a UL broadcast packet represent a single broadcast endpoint, and there is only a single transmitter (i.e., there is a single (joint) receiver status for a single transmitter to act on). This makes MAC layer CSMA/ARQ protocol more likely in UL. This helps to eliminate the over-the-air error or to improve the robustness of later transmitted data (retransmitted or new), and the non-AP WTRU does not need to solely rely on a unicast connection to the broadcast sink node via upper layer to provide robustness.

Example procedures for UL broadcast transmission may or may not be applied on a PPDU by PPDU basis (e.g., may be applicable to feedbacks within a duration after the UL broadcast transmission, and within the duration the UL transmitter of 802.11 MAC retains the information possibly needed to be repeated). The UL WTRU may base the UL broadcast transmission on the feedback to adjust the robustness of PPDUs to be sent after the feedback, without performing retransmissions of lost data. Example procedures for UL broadcast transmission may be applicable to non-broadcast PPDUs sent in UL direction in a multi-AP setup, where one AP is anchor or master AP and others APs are auxiliary receivers or slave APs for the anchor AP.

Figure 18:
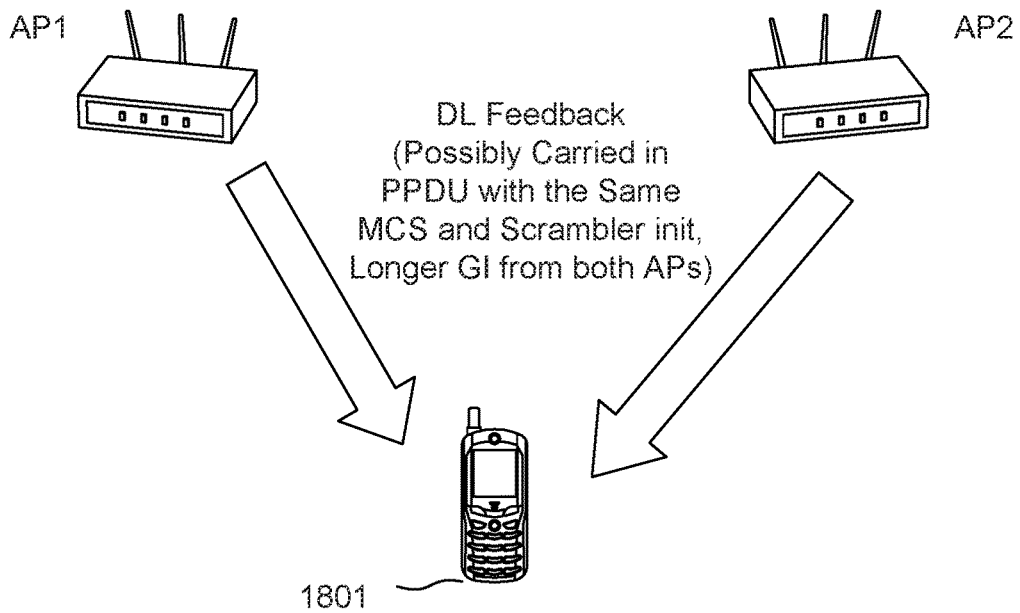
FIG. 18 shows an example procedure for APs to provide downlink (DL) feedback.

FIG. 18 shows an example of a transmitter to acquire a joint feedback, as a means to provide feedback to improve robustness. In an UL broadcast packet soliciting the feedback, a transmitting WTRU 1801 may indicate a MCS, scrambler initiation, and/or a longer guard interval (GI) to be used in the solicited DL feedback. In an embodiment, a predetermined MCS/GI may be used for the feedback PPDU in the DL, and/or the feedback PPDU scrambler initiation may be set to the same value as in the soliciting UL broadcast PPDU.

In an embodiment, the UL broadcast PPDU may indicate one or more APs that are allowed to perform feedback, to bound the delay spread of the feedback signal. If the transmitting WTRU does not receive any feedback, then the transmitting WTRU may infer that all APs are busy/interfered and may performed a delayed (re)-transmission. If the WTRU does not use the feedback procedure to perform retransmission (i.e. no retransmission for broadcast PPDUs), the WTRU may base its transmission on the feedback to adjust the robustness of the PPDU (e.g. power, MCS) to be sent in the future. If multiple APs successfully received the UL broadcast PPDU, their feedback frames may be combined over the air and decoded as a single PPDU at the non-AP WTRU.

Figure 19:
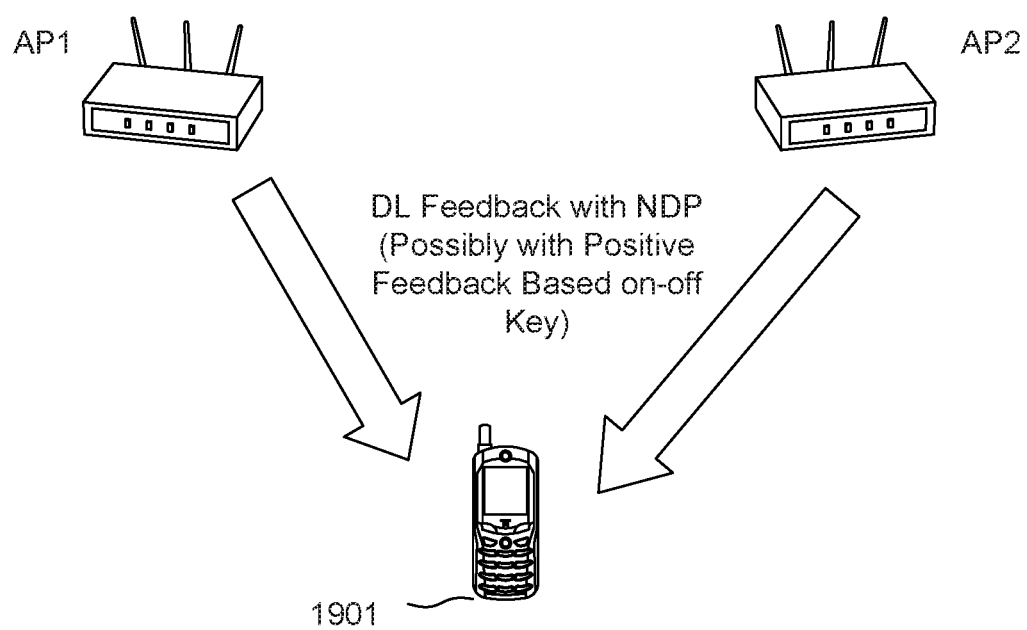
FIG. 19 shows an example procedure for APs to provide downlink (DL) feedback identifying a portion of lost data.

FIG. 19 shows another example procedure for APs to provide DL feedback, such that the transmitter may acquire a joint feedback (e.g., for each MPDU/data-block in one or more aggregated MPDUs (AMPDUs) transmitted in the UL). Mechanism may be used that allow transmission of AMPDUs without the need for a prior exchange to setup the feedback agreement. Such an unsolicited feedback agreement may be used in UL broadcast. The parameters for the agreement (e.g., buffer size, timeout value) may be set to pre-determined values for all WTRUs supporting UL broadcast.

To receive a single joint feedback bitmap corresponding to data-blocks/MPDUs, a NDP feedback approach may be used, for example, with positive-feedback-based on-off keying. A tone-set indicating 0 status may not be transmitted, while a tone-set indicating status 1 may be transmitted by the AP. A NDP long training field (LTF) may include a longer GI to cover the difference of propagation delays from different APs to the originator/transmitter, i.e., a non-AP WTRU 1901.

The UL broadcast PPDU may indicate a starting sequence number. The ACK signal on each tone-set may represent the feedback bit for a MPDU/data-block with a sequence number offset to the starting sequence number. Based on the energy of a tone-set, the originator/transmitter (i.e. non-AP WTRU) may derive the reception status of a MPDU/data-block sequence number based on the corresponding tone set index.

Because the NDP feedback may be positive-feedback-based on-off keying, the feedback NDP triggered by the UL broadcast PPDU may be seen by the originator as a single NDP. When the originator detects the NDP, the corresponding missing MPDUs/data-blocks may be retransmitted. If no NDP is detected, the originator may infer that all receivers (e.g., APs) are interfered/busy and may perform a delayed (re)-transmission. If the UL WTRU does not use the feedback procedure to perform retransmission (i.e., no retransmission for broadcast PPDUs), the WTRU may transmit based on the feedback to adjust the robustness of the PPDU (e.g., power, MCS) to be sent in the future.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a station (STA), the method comprising:
   generating, by a Station Management Entity (SME), a request primitive enabling wake-up radio (WUR) scanning for WUR discovery frames transmitted by one or more access points (APs), the request primitive comprising a plurality of first parameters including at least a MinDiscoveryChannelTime;
   conducting the WUR scanning process based on the plurality of first parameters;
   generating at least one confirm primitive based on a result of the WUR scanning and at least a subset of the plurality of first parameters, wherein each of the at least one confirm primitive comprises a plurality of second parameters including at least one of: at least a portion of a Basic Service Set Identifier (BSSID), or at least a portion of a Service Set Identifier (SSID); and
   communicating, to the SME, the at least one confirm primitive.

2. The method of claim 1, wherein the plurality of first parameters comprises at least one of a BSSIDList, an SSIDList, a compressedSSID, a CompressedBSSIDList, a CompressedSSIDList, a DiscoveryChannel, a DiscoveryChannelList, a MaxDiscoveryChannelTime, a MaxScanningTime, a ReceivedPowerThreshold, a WURScanningMode, a WURScanningReportingOption, or a RequestWURresult.

3. The method of claim 2, wherein the WURScanningMode indicates a WUR scanning mode.

4. The method of claim 1, wherein the plurality of second parameters further comprises a BSSDescriptionFromWURDFSet.

5. The method of claim 1 further comprising associating with a BSS based on one or more of the second plurality of parameters of the at least one confirm primitive.

6. The method of claim 1, wherein the request primitive is an MLME-WURSCAN Request primitive.

7. The method of claim 1, wherein the request primitive is generated by a station management entity (SME).

8. The method of claim 1, wherein the request primitive is an MLME-SCAN Request primitive.

9. The method of claim 1 further comprising generating a stop request primitive for stopping the WUR scanning process.

10. The method of claim 1 further comprising generating a stop confirm primitive.

11. A wireless-station (STA), comprising:
    a processor configured to:
    generate a request primitive enabling a wake-up radio (WUR) scanning process for WUR discovery frames transmitted by one or more access points (APs), the request primitive comprising a plurality of first parameters including at least a MinDiscoveryChannelTime;
    conduct the WUR scanning based on the plurality of the first parameters;
    generate at least one confirm primitive based on a result of the WUR scanning process and at least a subset of the plurality of first parameters, wherein each of the at least one confirm primitive comprises a plurality of second parameters including at least one of: a least a portion of a Basic Service Set Identifier (BSSID), or at least a portion of a Service Set Identifier (SSID); and
    communicate, to a Station Management Entity (SME), the at least one confirm primitive.

12. The STA of claim 11, wherein the plurality of first parameters comprises at least one of, a BSSIDList, an SSIDList, a compressedSSID, a CompressedBSSIDList, a CompressedSSIDList, a DiscoveryChannel, a DiscoveryChannelList, a MaxDiscoveryChannelTime, a MaxScanningTime, a ReceivedPowerThreshold, a WURScanningMode, a WURScanningReportingOption, or a RequestWURresult.

13. The STA of claim 12, wherein the WURScanningMode indicates a WUR scanning mode.

14. The STA of claim 11, wherein the plurality of second parameters further comprises a BSSDescriptionFromWURDFSet.

15. The STA of claim 11, further comprising a transceiver, the processor and the transceiver configured to associate with a BSS based on one or more of the second plurality of parameters of the at least one confirm primitive.

16. The STA of claim 11, wherein the request primitive is an MLME-WURSCAN Request primitive.

17. The STA of claim 11, wherein the request primitive is generated by a station management entity (SME).

18. The STA of claim 11, wherein the request primitive is an MLME-SCAN Request primitive.

19. The STA of claim 11, wherein the processor is further configured to generate a stop request primitive for stopping the WUR scanning process.

20. The STA of claim 11, wherein the processor is further configured to generate a stop confirm primitive.

* * * * *